United States Patent
Berryhill et al.

(10) Patent No.: US 7,776,265 B2
(45) Date of Patent: Aug. 17, 2010

(54) SYSTEM FOR DIAGNOSING REAGENT SOLUTION QUALITY

(75) Inventors: Ross C. Berryhill, Nashville, IN (US); Gregory R. White, Columbus, IN (US)

(73) Assignee: Cummins Filtration IP, Inc., Minneapolis, MN (US)

(*) Notice: Subject to any disclaimer, the term of this patent is extended or adjusted under 35 U.S.C. 154(b) by 1416 days.

(21) Appl. No.: 10/803,396

(22) Filed: Mar. 18, 2004

(65) Prior Publication Data
US 2005/0207936 A1 Sep. 22, 2005

(51) Int. Cl.
*G01M 15/10* (2006.01)
(52) U.S. Cl. .............. 422/68.1; 73/114.75; 700/55; 702/199
(58) Field of Classification Search .............. 73/114.69, 73/114.71, 114.75; 422/68.1; 700/55; 702/199
See application file for complete search history.

(56) References Cited

U.S. PATENT DOCUMENTS

| | | | |
|---|---|---|---|
| 5,085,840 A | | 2/1992 | Held et al. |
| 5,251,299 A | * | 10/1993 | Masuda et al. ............... 714/10 |
| 5,367,264 A | | 11/1994 | Brabetz |
| 5,394,744 A | * | 3/1995 | James et al. ............ 73/114.02 |
| 5,540,047 A | | 7/1996 | Dahlheim et al. |
| 5,546,004 A | | 8/1996 | Schmelz |
| 5,594,163 A | | 1/1997 | Suzuki |
| 5,628,186 A | | 5/1997 | Schmelz |
| 5,643,536 A | | 7/1997 | Schmelz |
| 5,717,339 A | | 2/1998 | Murphy et al. |
| 5,781,871 A | * | 7/1998 | Mezger et al. .............. 455/424 |
| 5,809,774 A | | 9/1998 | Peter-Hoblyn et al. |
| 5,809,775 A | | 9/1998 | Tarabulski et al. |
| 5,849,593 A | | 12/1998 | Schmelz |
| 5,884,475 A | | 3/1999 | Hofmann et al. |
| 5,929,754 A | | 7/1999 | Park et al. |
| 6,003,305 A | | 12/1999 | Martin et al. |
| 6,029,044 A | * | 2/2000 | Arsenault et al. .............. 725/68 |
| 6,063,350 A | | 5/2000 | Tarbulski et al. |
| 6,125,629 A | | 10/2000 | Patchett |
| 6,167,698 B1 | | 1/2001 | King et al. |
| 6,173,568 B1 | | 1/2001 | Zurbig et al. |

(Continued)

FOREIGN PATENT DOCUMENTS

DE 19841770 9/1998

(Continued)

*Primary Examiner*—Jill Warden
*Assistant Examiner*—Paul S Hyun
(74) *Attorney, Agent, or Firm*—Barnes & Thornburg LLP; J. Bruce Schelkopf

(57) ABSTRACT

A system for diagnosing the quality of a reagent solution may comprise a reagent solution source for supplying the reagent solution to an emissions catalyst of an internal combustion engine. Means may be provided for determining a quality value corresponding to the quality of the reagent solution. A first filter may receive the quality value and produce a first filtered quality value, and a first comparator may compare the filtered quality value to a threshold and produce a fault value if the first filtered quality value crosses the threshold. Alternatively or additionally, a second filter may receive the quality value and produce a second filtered quality value. A second comparator may compare a difference between the first and second filtered quality values to another threshold and produce another fault value if the difference crosses that threshold.

18 Claims, 8 Drawing Sheets

U.S. PATENT DOCUMENTS

| | | |
|---|---|---|
| 6,214,195 B1 | 4/2001 | Yadav et al. |
| 6,247,303 B1 | 6/2001 | Broer et al. |
| 6,266,955 B1 | 7/2001 | Liang et al. |
| 6,293,097 B1 | 9/2001 | Wu et al. |
| 6,297,733 B1 | 10/2001 | Park |
| 6,311,484 B1 | 11/2001 | Roth et al. |
| 6,357,226 B2 | 3/2002 | Borland |
| 6,363,716 B1 | 4/2002 | Balko et al. |
| 6,363,771 B1 | 4/2002 | Liang et al. |
| 6,408,619 B1 | 6/2002 | Wissler et al. |
| 6,415,602 B1 | 7/2002 | Patchett et al. |
| 6,422,005 B2 | 7/2002 | Dolling et al. |
| 6,427,439 B1 | 8/2002 | Xu et al. |
| 6,446,430 B1 | 9/2002 | Roth et al. |
| 6,467,257 B1 | 10/2002 | Khair et al. |
| 6,502,390 B2 | 1/2003 | Goerigk et al. |
| 6,517,702 B2 | 2/2003 | Stahl |
| 6,519,935 B2 | 2/2003 | Weigl |
| 6,531,704 B2 | 3/2003 | Yadav et al. |
| 6,546,720 B2 | 4/2003 | van Nieuwstadt |
| 6,550,250 B2 | 4/2003 | Mikkelsen et al. |
| 6,581,374 B2 | 6/2003 | Patchett et al. |
| 2002/0088220 A1 | 7/2002 | Weigl |
| 2002/0103583 A1* | 8/2002 | Ohmura et al. .............. 701/33 |
| 2002/0124568 A1 | 9/2002 | Mikkelsen et al. |
| 2002/0148220 A1 | 10/2002 | Patchett et al. |
| 2002/0152745 A1 | 10/2002 | Patchett et al. |
| 2003/0033799 A1 | 2/2003 | Scheying |
| 2003/0077212 A1 | 4/2003 | Hammer |

FOREIGN PATENT DOCUMENTS

| | | |
|---|---|---|
| EP | 352717 | 7/1989 |
| EP | 0866395 | 2/1998 |
| JP | 60-29658 | 2/1985 |
| JP | 62-206440 | 9/1987 |
| JP | 9005271 | 1/1997 |
| WO | WO 02/057603 | 7/2002 |
| WO | WO03/052393 | 6/2003 |

* cited by examiner

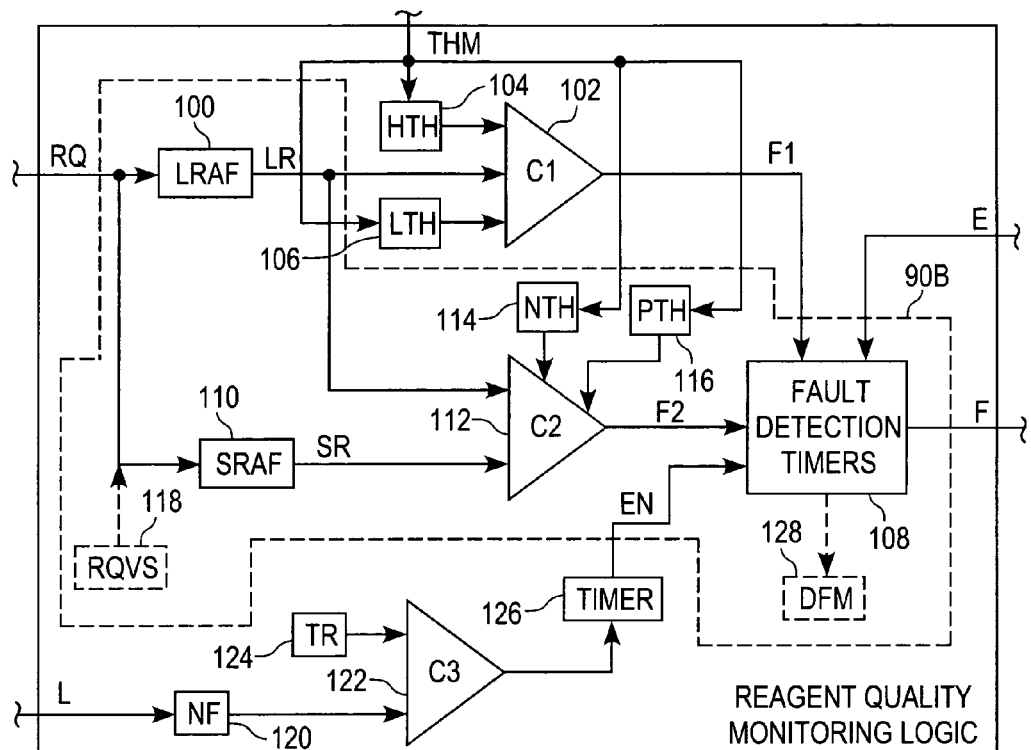
FIG. 4
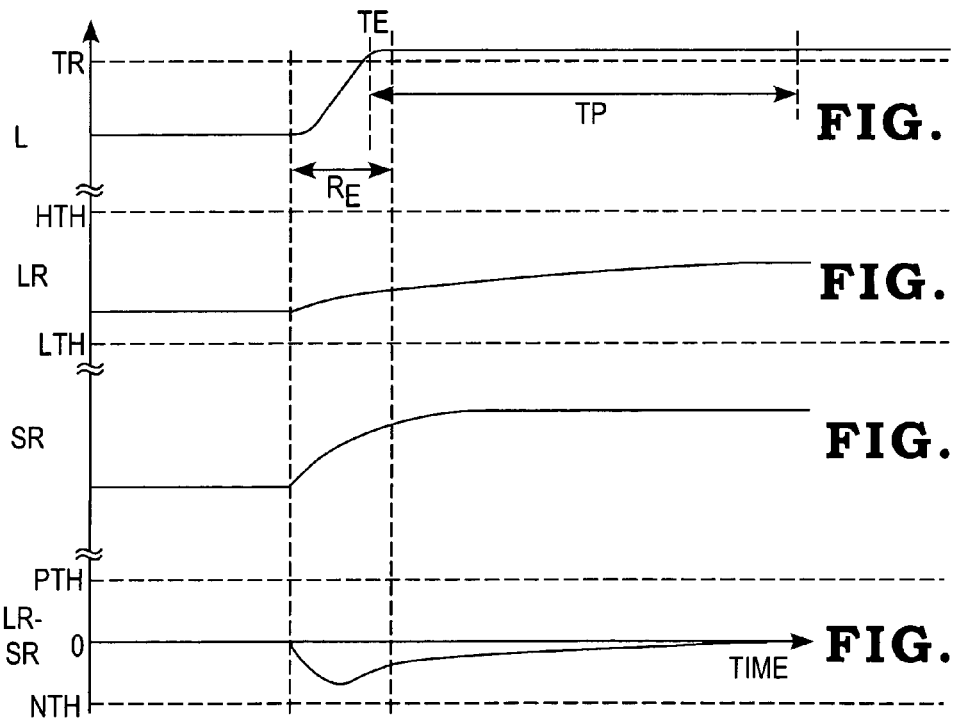
FIG. 5A
FIG. 5B
FIG. 5C
FIG. 5D

SYSTEM FOR DIAGNOSING REAGENT SOLUTION QUALITY

FIELD OF THE INVENTION

The present invention relates generally to systems for diagnosing reagent solution quality, and more specifically to such systems producing a fault indicator if the reagent quality deviates sufficiently from an expected reagent quality.

BACKGROUND OF THE INVENTION

Systems for treating exhaust gas produced by an internal combustion engine to reduce exhaust gas emissions in the form of particulates and/or NOx are generally known. Such exhaust gas "aftertreatment" systems may include a selective catalytic reduction system for the purpose of reducing the NOx level of the exhaust gas below a specified maximum NOx level.

A selective catalytic reduction system, or SCR, typically includes a catalytic reducing agent, or reagent, in the form of a reagent solution that is controllably dispensed into the exhaust gas stream produced by the engine before entering a conventional SCR catalyst. The SCR catalyst reacts with the combination of engine exhaust gas and reagent solution in a known manner to reduce the NOx content of the exhaust gas stream.

Prior to dispensing the reagent solution into the exhaust gas stream, there may be opportunities for the solution to become under-concentrated, over-concentrated and/or exposed to contaminants as a result of tampering, mechanical failures or undesirable mechanical operating conditions, and/or environmental degradation. It is therefore desirable to monitor the quality, e.g., concentration and/or contamination level, of the reagent solution under a wide variety of operating conditions, and to note occasions when the reagent solution quality is not within specified reagent quality limits, and to further modify conventional dosing of the reagent solution into the exhaust gas stream when the temperature of the reagent solution is at, or near, freezing temperatures.

SUMMARY OF THE INVENTION

The present invention may comprise one or more of the features recited in the attached claims and the following features and combinations thereof. A system for diagnosing the quality of a reagent solution may comprise a reagent solution source for supplying the reagent solution to an emissions catalyst of an internal combustion engine. Means may be provided for determining a quality value corresponding to the quality of the reagent solution. A filter may receive the quality value and produce a filtered quality value, and a comparator may compare the filtered quality value to a threshold and produce a fault value if the filtered quality value crosses the threshold. The filter may be a long-range averaging filter. The filter and the comparator may be implemented in the form of one or more software algorithms. The fault value may be logged in memory. Alternatively or additionally, the fault value may be transmitted by a wireless transceiver to a remote location. Alternatively or additionally, the fault value may trigger modification of engine performance by modifying engine fueling. Production of the fault value may alternatively or additionally result in illumination of a fault lamp. Alternatively or additionally, the fault value may be produced only after detection of a reagent solution refill event.

A system for diagnosing the quality of a reagent solution may comprise a reagent solution source for supplying the reagent solution to an emissions catalyst of an internal combustion engine. Means may be provided for determining a quality value corresponding to the quality of the reagent solution. A first filter may receive the quality value and produce a first filtered quality value. A second filter may receive the quality value and produce a second filtered quality value. A comparator may compare a difference between the first and second filtered quality values to a threshold and produce a fault value if the difference crosses the threshold. The first filter may be a long-range averaging filter, and the second filter may be a short-range averaging filter. The fault value may be logged in memory. Alternatively or additionally, the fault value may be transmitted by a wireless transceiver to a remote location. Alternatively or additionally, the fault value may trigger modification of engine performance by modifying engine fueling. Production of the fault value may alternatively or additionally result in illumination of a fault lamp. Alternatively or additionally, the fault value may be produced only after detection of a reagent solution refill event.

A system for diagnosing the quality of a reagent solution may comprise a reagent solution source for supplying the reagent solution to an emissions catalyst of an internal combustion engine. Means may be provided for determining a quality value corresponding to the quality of the reagent solution. A diagnostic circuit may process the quality value and produce a fault value if the quality of the reagent solution sufficiently deviates from an expected quality value. A temperature sensor may produce a temperature signal indicative of a temperature of the reagent solution within the reagent solution source. An enabling circuit may disable operation of the diagnostic circuit if the temperature signal indicates that the temperature of the reagent solution is less than a first predefined temperature. The diagnostic circuit and the enabling circuit may be implemented in the form of one or more software algorithms.

A system for diagnosing the quality of a reagent solution may comprise a reagent solution source having an outlet for supplying the reagent solution to an emissions catalyst of an internal combustion engine. A heater may be positioned near the reagent solution source outlet for heating the reagent solution within the reagent solution source. A concentration sensor may be positioned near the reagent solution source outlet and produce a concentration signal indicative of a concentration of reagent in the reagent solution near the reagent solution source outlet. A temperature sensor may be positioned near the reagent solution source outlet and produce a temperature signal indicative of the reagent solution near the reagent solution source outlet. A diagnostic circuit may produce a fault value if the quality of the reagent solution deviates from an expected quality value by at least one threshold value. A threshold modification circuit may activate the heater if the temperature signal indicates that the temperature of the reagent solution is less than a first predefined temperature. The threshold modification circuit may further modifying the at least one threshold value as a function of the concentration signal when a minimum amount of liquid reagent solution becomes available after activating the heater. The diagnostic circuit and the threshold modification circuit may be implemented in the form of one or more software algorithms.

A system for diagnosing the quality of a reagent solution may comprise a reagent solution source for supplying the reagent solution to an emissions catalyst of an internal combustion engine. Means may be provided for producing a quantity signal corresponding to the quantity of the reagent solution within the reagent solution source. A temperature sensor may produce a temperature signal indicative of a temperature of the reagent solution within the reagent solution source. A diagnostic circuit may produce a fault value if the quality of the reagent solution deviates from an expected quality value by at least one threshold value. A threshold modification circuit may be configured to reset a time value of an aging timer if the quantity signal indicates that the reagent solution source has been refilled. The threshold modification circuit may thereafter determine an aging value as a function of the time value of the aging timer and the temperature signal, and may then modify the at least one threshold value as a function of the aging value. The diagnostic circuit and the threshold modification circuit may be implemented in the form of one or more software algorithms.

These and other features of the present invention will become more apparent from the following description of the illustrative embodiment.

BRIEF DESCRIPTION OF THE DRAWINGS

FIG. 4 is a schematic diagram of one illustrative embodiment of the reagent quality monitoring logic block of FIG. 3.

FIG. 5A is a plot of the level signal produced by the level sensor of FIG. 1 before, during and after a reagent solution refill event.

FIG. 5B is a plot of the output of the long-range averaging filter of FIG. 4 before, during and after a reagent solution refill event.

FIG. 5C is a plot of the output of the short run averaging filter of FIG. 4 before, during and after a reagent solution refill event.

FIG. 5D is a plot of the difference between the long run and short run averaging filter outputs before, during and after a reagent solution refill event.

DESCRIPTION OF THE ILLUSTRATIVE EMBODIMENTS

Figure 1:
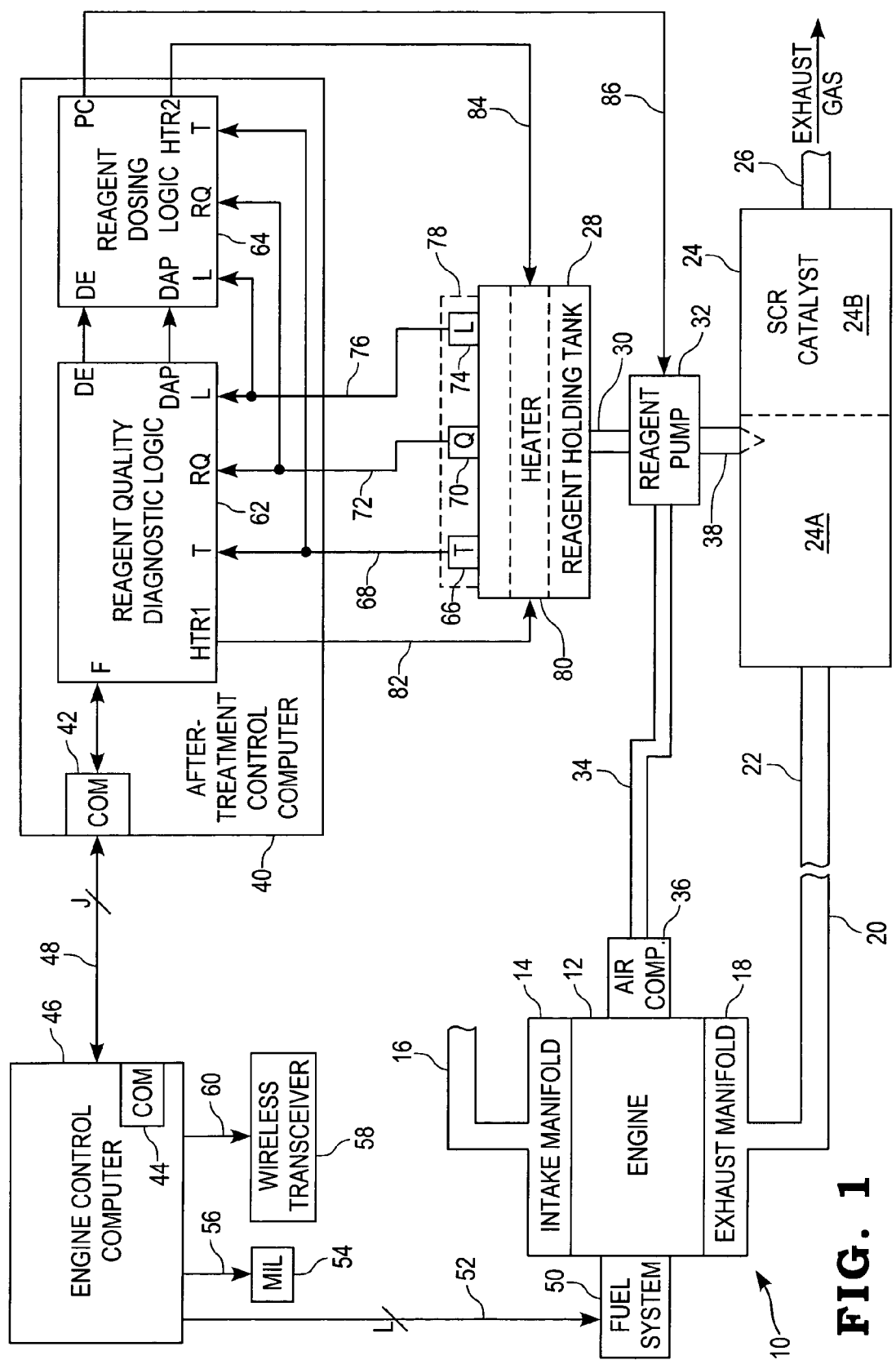
FIG. 1 is a block diagram of one illustrative embodiment of a system for diagnosing reagent solution quality.

For the purposes of promoting an understanding of the principles of the invention, reference will now be made to a number of illustrative embodiments illustrated in the drawings and specific language will be used to describe the same.

Referring now to FIG. 1, a block diagram is shown of one illustrative embodiment of a system 10 for diagnosing reagent solution quality. In the illustrated embodiment, system 10 includes an internal combustion engine 12 having an intake manifold 14 fluidly coupled to an intake pipe or conduit 16 for receiving fresh air. An exhaust manifold 18 of the engine 12 is fluidly coupled to an exhaust pipe or conduit 20, and exhaust gas resulting from the combustion process within the engine 12 is directed away from the exhaust manifold 18 via the exhaust pipe or conduit 20. Another exhaust pipe or conduit 22 is fluidly connected to an inlet of an emissions catalyst 24 having an outlet fluidly coupled to yet another exhaust pipe or conduit 26. In some embodiments, the exhaust pipe or conduit 20 is fluidly coupled directly to the exhaust pipe or conduit 22, and in such embodiments the exhaust gas produced by the engine 12 is directed to the inlet of the emissions catalyst 24 via pipes 20 and 22. In other embodiments, the exhaust pipe or conduit 20 is fluidly coupled to a turbine inlet of a conventional turbocharger (not shown), and a turbine outlet of the turbocharger is fluidly coupled to the exhaust pipe or conduit 22. In such embodiments the exhaust gas produced by the engine 12 is directed through the turbocharger to the inlet of the emissions catalyst 24 via the exhaust pipe or conduit 20, and to the inlet of the emissions catalyst via the exhaust pipe or conduit 22. In either case, exhaust gas exiting the outlet of the emissions catalyst 24 is expelled to ambient via the exhaust pipe or conduit 26.

In the illustrated embodiment, the emissions catalyst includes a conventional SCR catalyst 24B separated by a space 24A from the exhaust conduit 22. The SCR catalyst 24B is configured to reduce the NOx content of the exhaust gas in a known manner. Those skilled in the art will recognize that the emissions catalyst 24 may include more or fewer components, although for purposes of this disclosure the emissions catalyst 24 includes at least the SCR catalyst 24B.

The system 10 further includes a reagent source in the form of a reagent holding tank 28 configured to hold a conventional aqueous reagent solution; e.g., aqueous urea solution or the like. The reagent holding tank 28 defines a reagent solution outlet fluidly coupled to one end of a reagent outlet conduit 30 having an opposite end fluidly coupled to an inlet of a conventional reagent solution pump 32. In the illustrated embodiment, the reagent solution pump 32 is a pneumatic pump having an air inlet fluidly coupled via an air conduit 34 to a conventional air compressor 36 that is driven by the engine 12, although it will be understood that the reagent solution pump 32 may alternatively be or include other conventional liquid supply pumps. In any case, a liquid outlet of the reagent solution pump 32 is fluidly coupled to an inlet of a reagent solution injector or spray nozzle 38 having an opposite solution dispensing end fluidly coupled to the emissions catalyst 24 in the space 24A upstream of the SCR catalyst 24B. The reagent solution pump 32 may be controlled in a known manner to selectively spray or otherwise dispense via the injector or spray nozzle 38 the reagent solution from the reagent holding tank into the exhaust gas stream flowing through the space 24A of the emission catalyst 24 so that a combination of the exhaust gas exiting the exhaust conduit 22 and the reagent dispensed by the reagent pump 32 enters the SCR catalyst 24B. The SCR catalyst 24B is operable, as is known in the art, to react with the combination in a manner that reduces the level or amount of NOx in the exhaust gas entering the SCR catalyst 24B to maintain the NOx level or amount in the exhaust gas exiting the SCR catalyst 24B at or below a target NOx level or amount.

The system 10 further includes an aftertreatment control computer 40 configured to manage and control the overall operation of the reagent holding tank 28 and the reagent pump 32. Illustratively, the control computer 40 is microprocessor-based, and includes a memory having one or more software algorithms stored therein for execution by the control computer 40 to control operation of the reagent holding tank 28 and reagent pump 32. The aftertreatment control computer 40 further includes a communication port (COM) 42 electrically connected to a communication port (COM) 44 of an engine control computer 46 via a number, J, of signal paths 48, wherein J may be any positive integer. The engine control computer 46 is configured to manage and control the overall operation of the engine 12. In the illustrated embodiment, the engine control computer 46 is microprocessor-based, and includes a memory having one or more software algorithms stored therein for execution by the control computer 46 to control operation of the engine. The engine control computer 46 may sometimes be referred to as an "engine control module" or "ECM", an "engine control unit", or "ECU" or the like. It will be understood that while the aftertreatment control computer 40 and the engine control computer 46 may each be microprocessor-based control computers as illustrated and described, each may alternatively be or include a general purpose control computer or control circuit configured for operation as described hereinafter.

The communication ports 42 and 44 of the control computers 40 and 46 respectively are configured for data communications according to a conventional communications protocol, and in the illustrated embodiment, the communications protocol is the Society of Automotive Engineers (SAE) J1939 communications protocol. In this embodiment, the "J" signal paths 48 accordingly represent a SAE J1939 serial data link configured for communications between control computers 40 and 44 according to the SAE J1939 communications protocol. Alternatively, the communication ports 42 and 44 of the control computers 40 and 46 respectively may be configured for communications according to any known communications protocol, and examples of some such known communications protocols include, but are not limited to, SAE J1587/J1708 communications protocol, control area network (CAN) protocol, universal serial bus (USB) protocol, RS232 communications protocol, a conventional wireless communications protocol, or the like. In such alternative embodiments, the "J" signal paths 48 may be any corresponding serial, parallel and/or wireless communications link or path.

The engine control computer 46 is electrically connected to a fuel system 50 of the engine 12 via a number, L, of signal paths 52, wherein L may be any positive integer. The engine control computer 46 is operable in a known manner to produce one or more fuel control signals on signal path 52 based on engine operating information including, for example, but not limited to, engine speed, driver requested speed or torque, and the like. The fuel system 50 is, in turn, responsive to the one or more fuel control signals produced by the engine control computer 46 to correspondingly supply fuel to the engine 12.

The engine control computer 46 is also connected to a malfunction indicator lamp (MIL) 54 via signal path 56. The engine control computer 46 may be operable, in some embodiments, to activate the lamp 54 under certain diagnostic conditions relating to the quality of the reagent solution contained in the reagent holding tank 28, as will be described in greater detail hereinafter. The engine control computer 46 is also connected to a conventional wireless transceiver 58 via signal path 60. In some embodiments, the engine control computer 46 may be operable to transmit certain diagnostic information relating to the quality of the reagent solution contained in the reagent holding tank 28 to a remote system, as will be described in greater detail hereinafter. The remote system, in such embodiments, may be, for example, a central computer or communication system located remotely from the vehicle carrying the engine 12.

In the illustrated embodiment, the aftertreatment control computer 40 includes a reagent quality diagnostic logic block 62 having a fault output, F, in communication with the communication port 42. Dosing enable, DE, and dosing adjustment parameter, DAP, outputs of the reagent quality diagnostic block 62 are supplied to dosing enable, DE, and dosing adjustment parameter, DAP, inputs of a reagent dosing logic block 64. The reagent quality diagnostic logic block 62 and the reagent dosing logic block 64 each further including a number of inputs for receiving information relating to the operating state of the reagent holding tank 28 and/or reagent solution contained therein. For example, the logic blocks 62 and 64 each include a temperature input, T, electrically connected to a temperature sensor 66 via signal path 68. The temperature sensor 66 is a conventional sensor suitably positioned relative to the reagent holding tank 28, and is configured to produce a temperature signal indicative of the temperature of the reagent solution contained in the tank 28. In one embodiment, the temperature sensor 66 is positioned in fluid contact with the reagent solution contained in the tank 28, and in this embodiment the temperature signal produced by the sensor 66 is a direct measure of the temperature of the reagent solution contained in the tank 28. In an alternate embodiment, the temperature sensor 66 may be positioned in contact with a surface of the reagent holding tank 28 such that the temperature signal produced by the sensor 66 corresponds to the temperature of the reagent holding tank 28 itself. In this embodiment, the logic blocks 62 and 64 may include one or more conversion relationships; e.g., one more tables, equations, constants, or the like, for converting the sensed temperature of the tank 28 to reagent solution temperature. Alternatively, the logic blocks 62 and 64 may be configured to simply use the temperature of reagent holding tank 28 as the reagent solution contained therein, and in this case the temperature signal produced by the sensor 66 may accordingly be considered to be a direct measurement of the reagent solution contained in the tank 28. In any case, the temperature sensor 66 is operable to produce a temperature signal that is "indicative" of the temperature of the reagent solution contained in the reagent holding tank 28 in that the temperature of the reagent solution may be determine directly from, inferred from, or otherwise determined from, the temperature signal produced by the sensor 66.

The logic blocks 62 and 64 also each include a reagent quality input, RQ, electrically connected to a reagent quality sensor 70 via signal path 72. The reagent quality sensor 70 is a conventional sensor suitably positioned relative to the reagent holding tank 28, and is configured to produce a reagent quality signal indicative of the quality of the reagent solution contained in the tank 28. For the purpose of this document, the term "reagent quality" is defined as the concentration of the reagent in the reagent solution and/or the level of detectable contamination in the reagent solution, and the term "detectable contamination" is defined as any substance other than the reagent and the mixing solution; e.g., water, that, when added to the reagent solution, causes a detectable change in one or more physical properties of the reagent solution. Examples of such detectable contamination include, but are not limited to, salts, phosphates and/or other substances or solutions that, when added to the reagent solution, cause a detectable change in the electrical properties of the reagent solution, substances or solutions that, when added to the reagent solution, cause a detectable change in the refractive or optical properties of the reagent solution, substances or solutions that, when added to the reagent solution, cause a detectable change in the density of the reagent solution, substances or solutions that, when added to the reagent solution, cause a detectable change in the spectral absorption properties of the reagent solution, and the like.

In one embodiment, for example, the reagent quality sensor 70 may be a conventional conductivity sensor positioned in fluid contact with the reagent solution contained in the tank 28, and configured to produce a conductivity signal corresponding to the electrical conductivity of the reagent solution contained in the reagent holding tank 28. In this embodiment, the reagent quality diagnostic logic block 62 and the reagent dosing logic block 64 are configured to process the conductivity signal produced by the sensor 70 in a known manner to determine the concentration and/or detectable contamination level of the reagent solution. In alternate embodiment, the reagent quality sensor 70 may be a conventional relative permittivity sensor positioned in fluid contact with the reagent solution contained in the tank 28, and configured to produce a permittivity signal corresponding to the dielectric constant of the reagent solution contained in the reagent holding tank 28 relative to a baseline dielectric constant value. In this embodiment the reagent quality diagnostic logic block 62 and the reagent dosing logic block 64 are configured to process the permittivity signal produced by the sensor 70 in a known manner to determine the concentration and/or detectable contamination level of the reagent solution. In another alternate embodiment, the reagent quality sensor 70 may be a combination conductivity and relative permittivity sensor positioned in fluid contact with the reagent solution contained in the tank 28, and configured to produce a conductivity and permittivity signal corresponding to the conductivity and dielectric constant of the reagent solution contained in the reagent holding tank 28. In this embodiment the reagent quality diagnostic logic block 62 and the reagent dosing logic block 64 are configured to process the conductivity and permittivity signal produced by the sensor 70 in a known manner to determine the concentration and/or detectable contamination level of the reagent in the reagent solution.

In yet another alternate embodiment, the reagent quality sensor 70 may be or include one or more conventional sensors producing a signal or signals corresponding to, or from which, one or more physical properties of the reagent solution in the reagent holding tank 28 may be determined, wherein the concentration and/or detectable contamination level of the reagent solution in the reagent holding tank may be determined in a conventional manner from the one or more physical properties. Examples of physical properties of the reagent solution that may be determined and from which the concentration and/or contamination level of the reagent solution may be determined include, but are not limited to, density of the reagent solution, refractive index of the reagent solution, spectral absorption of the reagent solution, and the like. In this embodiment the reagent quality diagnostic logic block 62 and the reagent dosing logic block 64 are configured to process the signal or signals produced by the one or more sensors making up the illustrated sensor 70 in a known manner to determine the concentration and/or contamination level of the reagent solution. In any case, the quality sensor 70 is operable to produce one or more signals "indicative" of the quality of the reagent solution contained in the reagent holding tank 28 in that the quality of the reagent solution may be determined directly from or inferred from, the one or more signals produced by the illustrated sensor 70.

The logic blocks 62 and 64 each further include a level input, L, electrically connected to a level sensor 74 via signal path 76. In the illustrated embodiment, the level sensor 74 is a conventional sensor suitably positioned relative to the reagent holding tank 28, and is configured to produce a level signal indicative of the liquid level of the reagent solution contained in the tank 28. In one embodiment, the level sensor 74 is positioned in fluid contact with the reagent solution contained in the tank 28, and in this embodiment the level signal produced by the sensor 74 is a direct measure of the level of the reagent solution contained in the tank 28. In an alternate embodiment, the level sensor 74 may include a number of sensor elements positioned along at least one inner wall of the tank 28. In this embodiment, the logic blocks 62 and 64 are configured to process the signals produced by the number of sensor elements in a known manner to determine the liquid level of the reagent solution contained in the reagent holding tank 28. In another alternative embodiment, the level sensor 74 may be or include one or more pressure sensors suitably positioned relative to the reagent solution contained in the reagent holding tank 28, and configured to produce one or more pressure signals corresponding to the pressure of the liquid reagent solution contained in the tank 28. In this embodiment, the logic blocks 62 and 64 are configured to process the one or more pressure signals in a known manner to determine the liquid level of the reagent solution contained in the reagent holding tank 28. Alternatively still, the level sensor 74 may be or include one or more other known sensors producing signals from which the level of liquid reagent solution contained within the reagent holding tank 28 may be inferred or otherwise determined. For example, the level sensor 74 may be or include one or more conventional sensors configured to produce one or more corresponding signals indicative of liquid displacement within the reagent holding tank 28. In this embodiment, the logic blocks 62 and 64 are configured to process the one or more liquid displacement signals in a known manner to determine the liquid level of the reagent solution contained in the reagent holding tank 28. In any case, the level sensor 74 is operable to produce a level signal that is "indicative" of the liquid level of the reagent solution contained in the reagent holding tank 28 in that the level of the reagent solution may be determine directly from, or inferred from, the level signal produced by the sensor 74.

It will be understood that while the temperature, quality and level sensors 66, 70 and 74 respectively are illustrated and described with respect to FIG. 1 as being separate sensors, these sensors may alternatively be provided as one or more combination sensors. In one embodiment, for example, the sensors 66, 70 and 74 may be provided as a single combined sensor as illustrated by the dashed-line boundary 78. In this embodiment, a single sensor 78 positioned in fluid communication with the reagent solution contained within the reagent holding tank 28 includes a reagent solution temperature sensor, a liquid reagent solution level sensor and a combination conductivity and permittivity sensor. Those skilled in the art will recognize other sensor combinations configured to provide the sensor information produced by sensors 66, 70 and 74, and such other sensor combinations are intended to fall within the scope of the appended claims.

The reagent quality diagnostic logic block 62 has a heater control output, HTR1, electrically connected to a reagent solution heater 80 associated with the reagent holding tank 28 via signal path 82, and the reagent dosing logic block 64 has another heater control output, HTR2, electrically connected to the reagent solution heater 80 via signal path 84. The reagent dosing logic block 64 is operable in a conventional manner to control operation of the heater 80 as a function of the reagent solution temperature signal on signal path 68 in an attempt to keep the reagent solution in the reagent holding tank 28 from freezing as the ambient temperature decreases toward and below the reagent solution freezing temperature. The reagent quality diagnostic logic block 62, on the other hand, is operable in a manner that will be more fully described hereinafter with respect to FIGS. 9A-9B and 10 to control operation of the heater 80 when it is determined that the reagent solution contained within the reagent holding tank 28 is or may be at least partially frozen. In any case, a pump control output, PC, of the reagent dosing logic block 64 is electrically connected to a control input of the reagent pump 32 via signal path 86, and the logic block 64 is operable in a known manner to control the dosing quantity and rate of reagent solution into the emissions catalyst 24 by controlling the pump control signal on signal path 86.

Figure 2:
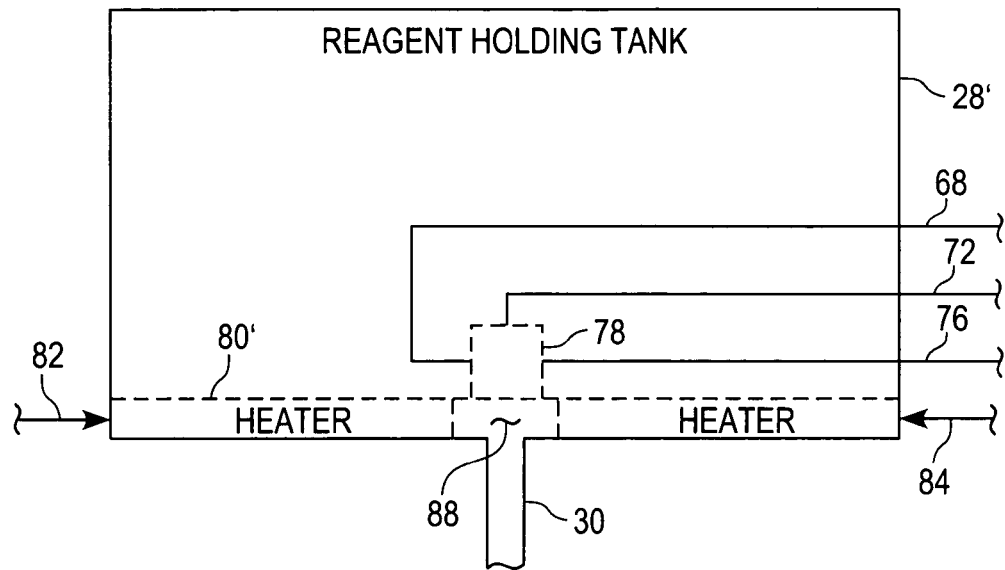
FIG. 2 is a diagram of one illustrative embodiment of the reagent holding tank of FIG. 1.

Referring now to FIG. 2, one illustrative embodiment 28' of the generalized reagent holding tank 28 of FIG. 1 is shown. In the illustrated embodiment, the reagent solution heater 80' is positioned along the bottom of the tank 28', and an opening in the heater 80' is defined about the reagent solution outlet port 88 that is fluidly coupled to the inlet of the conduit 30. The combination temperature, level and permittivity/conductivity sensor 78 is positioned near the opening in the heater 80' and near the reagent solution outlet port 88. In this embodiment, the reagent solution heater 80' is positioned to liquefy near the reagent solution outlet port 88 of the tank 28' any of the reagent solution that may have become partially or fully frozen to thereby provide for at least some reagent solution at the reagent solution outlet port 88 that is in the liquid phase. The sensor 78 is also positioned near the reagent solution outlet port 88 in this embodiment so that at least the concentration of the liquefied reagent solution near the reagent solution outlet port 88 may be determined. It will be understood that the embodiment of the reagent holding tank 28' shown in FIG. 2 is provided only by way of example, and is not intended to in any way limit the claims appended hereto.

Figure 3:
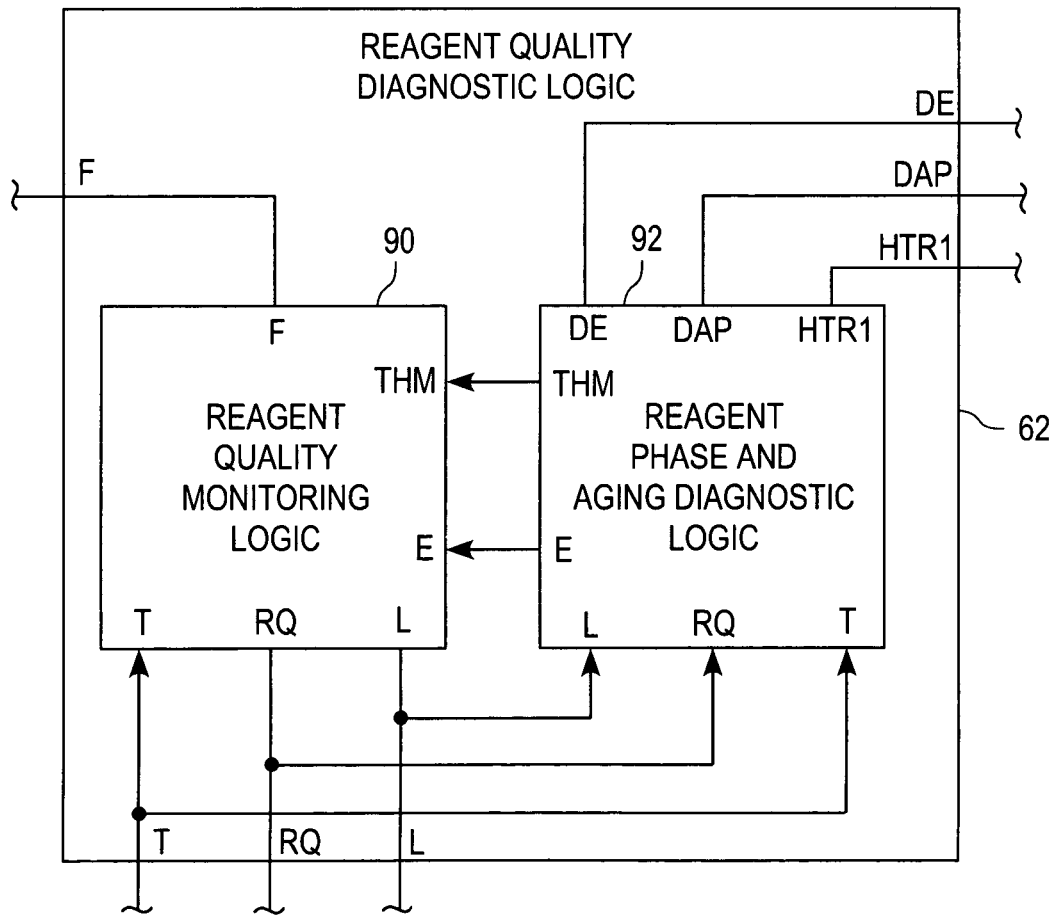
FIG. 3 is a block diagram illustrating one illustrative embodiment of the reagent quality diagnostic logic block of FIG. 1.

Referring now to FIG. 3, one illustrative embodiment of the reagent quality diagnostic block 62 forming part of the aftertreatment control computer 40 of FIG. 1 is shown. In the illustrated embodiment, the reagent quality diagnostic block 62 includes a reagent quality monitoring logic block 90 and a reagent phase and aging diagnostic logic block 92. The reagent quality monitoring logic block 90 and the reagent phase and aging diagnostic logic block 92 both have a temperature input, T, a reagent quality input, RQ, and a liquid reagent solution level input, L, each in data communication with corresponding temperature, reagent quality and liquid reagent solution level inputs, T, RQ and L respectively, of the reagent quality diagnostic logic block 62. The reagent quality monitoring logic block 90 further includes a threshold modification input, THM, and an enable input, E, in data communication with a corresponding threshold modification output, THM, and enable output, E, respectively of the reagent phase and aging diagnostic logic block 92. The reagent quality monitoring logic block 90 further includes a fault output, F, in data communication with the corresponding fault output, F, of the reagent quality diagnostic logic block 62. The reagent phase and aging diagnostic logic block 92 further includes a dosing enable output, DE, a dosing adjustment parameter output, DAP, and a heater control output, HTR1, in data communication with corresponding dosing enable, dosing adjustment parameter and heater control outputs, DE, DAP and HTR1 respectively of the reagent quality diagnostic logic block 62. As will be described more fully hereinafter, the reagent quality monitoring logic block 90 is configured to monitor the quality of the reagent solution contained in the reagent holding tank 28 (or 28'), and to produce a reagent quality fault at the fault output, F, if the monitored reagent quality sufficiently deviates from an expected reagent quality. The reagent phase and aging diagnostic logic block 92, on the other hand, is configured to monitor the physical phase and age of the reagent solution contained in the reagent holding tank 28 (or 28'), and to enable/disable operation of the reagent quality monitoring logic block 90 and/or the reagent dosing logic block 64 under some operating conditions, and to modify one or more reagent quality monitoring thresholds associated with the reagent quality monitoring logic block 90 and/or modify the pump control signal produced by the reagent dosing logic block 64 under other operating conditions.

Referring now to FIG. 4, one illustrative embodiment 90A of the reagent quality monitoring logic block 90 is shown. All of the components of the reagent quality monitoring logic block 90A illustrated in FIG. 4 are intended to represent a software algorithm in the form of software structures and/or memory blocks. It will be understood, however, that any one or more such software structure and/or memory block may alternatively be provided in the form of one or more hardware circuits. For purposes of this disclosure and claims appended hereto, any of the components of the reagent quality monitoring logic block 90A illustrated in FIG. 4 may be referred to herein as a "circuit", wherein the term "circuit" is intended to encompass both hardware circuits and software structures of the type just described and of the type illustrated in FIG. 4.

The reagent quality monitoring logic block 90A includes a filter block 100 having an input receiving the reagent quality signal, RQ, and an output producing a filtered reagent quality signal. In the illustrated embodiment, the filter block 100 is configured as a long run averaging filter operable to produce as an output a long run average, LR, of the reagent quality signal. The long run average filter 100 may be, for example, a conventional first-order filter having a transfer function of the form $1/(T_{QLONG}*S+1)$, where "$T_{QLONG}$" is the filter time constant. It will be understood that the filter block 100 may alternatively be configured in accordance with other known signal filtering structures and strategies operable to produce a filtered signal that represents the reagent quality signal smoothed over some predefined time period. Examples of such alternate filtering strategies may include, but are not limited to, any Nth-order averaging filter, an integrator, or the like. In any case, the output of the filter block 100 is provided as an input to a comparator 102 having one switching threshold established by a high threshold value, HTH, stored in a memory block 104, and having another switching threshold established by a low threshold value, LTH, stored in a memory block 106. The memory blocks 104 and 106 are also in data communication with the threshold modification input, THM, of the reagent quality monitoring logic block 90A. The output of the comparator 102 is a first fault signal, F1, and is provided as an input to a fault detection timer block 108. The comparator 102 is configured to switch F1 to a first state when the filtered reagent quality, LR, is above HTH or below LTH, and to switch F1 to a second opposite state when LR is between HTH and LTH. In the illustrated embodiment, the fault signal, F1, is active; i.e., a fault is detected, when the long run average, LR, of the reagent quality signal, RQ, is outside the window defined by HTH and LTH, and is inactive; i.e., no fault exists, when the long run average, LR, of the reagent quality signal, RQ, is within the window defined by HTH and LTH.

The reagent quality monitoring logic block 90A further includes another filter block 110 having an input receiving the reagent quality signal, RQ, and an output producing another filtered reagent quality signal. In the illustrated embodiment, the filter block 110 is configured as a short run averaging filter operable to produce as an output a short run average, SR, of the reagent quality signal. The short run average filter 110 may be, for example, a conventional first-order filter having a transfer function of the form $1/(T_{QSHORT}*S+1)$, where "$T_{QSHORT}$" is the filter time constant. It will be understood that the filter block 110 may alternatively be configured in accordance with other known signal filtering structures and strategies operable to produce a filtered signal that represents the reagent quality signal smoothed over some predefined time period. Examples of such alternate filtering strategies may include, but are not limited to, any Nth-order averaging filter, an integrator, or the like. In any case, the output of the filter block 100 is provided as one input to a comparator 112 having a second input receiving the output of the filter block 110. The comparator 102 has one switching threshold established by a positive threshold value, PTH, stored in a memory block 114, and has another switching threshold established by a negative threshold value, NTH, stored in a memory block 116. The memory blocks 114 and 116 are also in data communication with the threshold modification input, THM, of the reagent quality monitoring logic block 90A. The comparator 112 is configured to compare a difference between the long run average, LR, of the reagent quality signal, RQ, and the short run average, SR, of the reagent quality signal, RQ, to the positive and negative thresholds PTH and NTH respectively, and to produce as an output a second fault signal, F2, based on this comparison. F2 is provided as another input to the fault detection timer block 108. The comparator 112 is configured to switch F2 to a first state when the difference between LR and SR is above PTH or below NTH, and to switch F2 to a second opposite state when the difference between LR and SR is between PTH and NTH. In the illustrated embodiment, the fault signal, F2, is active; i.e., a fault is detected, when LR-SR is outside the window defined by PTH and NTH, and is inactive; i.e., no fault exists, when LR-SR, is within the window defined by PTH and NTH.

As an alternative to, or in addition to, processing the reagent quality signal, RQ, produced by the reagent quality sensor 70 described hereinabove, the reagent quality monitoring logic block 90A may include a reagent quality virtual sensor block 118, as illustrated in phantom in FIG. 4, that is configured to determine a reagent quality value, corresponding to the quality of the reagent solution contained in the reagent holding tank 28 (or 28'), as a function of one or more operating conditions other than the reagent quality signal produced by the reagent quality sensor 70. Such a reagent quality virtual sensor block 118 may include one or more software algorithms configured to estimate reagent quality, RQ, as a function of one or more engine, air handling system and/or reagent handling system operating parameters. An example of one such algorithm configured to estimate the reagent quality, RQ, as a function of normalized reagent solution flow rate and normalized NOx flow rate from the engine is described in U.S. Pat. No. 7,067,319, which is assigned to the assignee of the present invention, and the disclosure of which is incorporated herein by reference. Those skilled in the art will recognize that the reagent quality virtual sensor block 118 may alternatively or additionally include one or more other known software algorithms configured to estimate a reagent quality value as a function of one or more engine, air handling system and/or reagent handling system operating conditions, and any such other known software algorithms are intended to fall within the scope of the claims appended hereto. In any case, it will be understood that any such reagent quality value produced by the reagent quality virtual sensor block 118 may be processed by the filter blocks 100 and 110 instead of, or in addition to, the reagent quality signal, RQ, produced by the reagent quality sensor 70. In embodiments of the reagent quality monitoring logic block 90A that include or receive more than one such reagent quality value, suitable modifications may be made to block 90A to include additional logic structures for processing the additional reagent quality values and recognizing additional fault values. Any such modifications would be a mechanical step for a skilled artisan.

The reagent quality monitoring logic block 90A further includes a noise filter 120 having an input receiving the level signal, L, produced by the level sensor 74, and an output producing the filtered level signal. In one embodiment, the noise filter 120 may be a conventional first-order filter having a transfer function of the form $1/(T_{LEVEL}*S+1)$, where "$T_{LEVEL}$" is the filter time constant. It will be understood that the filter block 120 may alternatively be configured in accordance with other known noise filtering structures and strategies operable to produce a filtered signal that removes at least some of the noise present in the level signal, L, produced by the level sensor 74. In any case, the filtered level signal is provided to one input of another comparator 122 having another input receiving a trigger threshold value, TR, stored in a memory block 124. The output of the comparator 122 is provided to the input of a timer block 126 having an output providing an enable signal, EN, to the fault detection timer block 108. The comparator 122 is operable to compare the filtered level signal to the trigger threshold, TR, wherein "TR" corresponds to a predefined level of reagent solution within the reagent holding tank 28 (or 28'). When the filtered level signal is greater than TR, the output of the comparator 122 switches states and resets the timer block 126. Upon reset, the timer block 126 produces an active enable signal, EN, which enables the reagent quality monitoring logic block 90A by enabling the fault detection timer block 108 until the timer block 126 times out, at which time the timer block 126 deactivates the enable signal, EN, which disables the reagent quality monitoring logic block 90A by disabling the fault detection timer block 108. Alternatively or additionally, the enable signal produced by the timer block 126 may be provided to the comparators 102 and 112, and/or to the filter blocks 100 and 110, to enable/disable the reagent quality monitoring logic block 90A by enabling/disabling these structures.

The fault detection timer block 108 further includes an enable input receiving the enable signal, E, produced by the reagent phase and aging diagnostic logic block 92. The reagent phase and aging diagnostic logic block 92 may thus enable and disable operation of the reagent quality monitoring logic block 90A via appropriate control of the enable signal, E, as will be described in greater detail hereinafter. As with the enable signal, EN, produced by the timer block 126, the enable signal, E, produced by the reagent phase and aging diagnostic logic block 92 may alternatively or additionally be provided to the comparators 102 and 112, and/or to the filter blocks 100 and 110, to enable/disable the reagent quality monitoring logic block 90A by enabling/disabling these structures. In any case, the fault detection timer logic block 108 is operable, after passage of a predefined timer period following enablement thereof, to switch the fault value, F, to an active fault status if either of the fault values F1 and F2 are active, and to switch the fault value, F, to an inactive fault status if both of the fault values F1 and F2 are inactive. The fault detection timer block 108 may further be operable to log any one or more of the fault values, F1, F2 and F in a diagnostic fault memory location 128 as shown in phantom. Alternatively or additionally, the aftertreatment control computer 40 may provide the fault value, F, to the engine control computer 46 via the data link 46. The engine control computer 46 may, in turn, be responsive to an active status of the fault value, F, to log the fault value, F, in a suitable memory location of the engine control computer 46. Alternatively or additionally, the engine control computer 46 may be responsive to an active status of the fault value, F, to impose a performance penalty on the engine 12 by modifying the fuel control signals provided to the fuel system 50 on signal paths 52 to reduce available fueling for at least a specified time period. Alternatively or additionally, the engine control computer 46 may be responsive to an active status of the fault value, F, to illuminate the malfunction indicator lamp 54. Alternatively or additionally, the engine control computer 46 may be responsive to an active status of the fault value, F, to transmit the fault value, F, to a remote system via the wireless transceiver 58.

It is recognized that identifiable changes in the quality of the reagent solution may typically occur during reagent solution refill events due to mismatches between the quality of the existing reagent solution and that of the reagent solution being added, and/or due to tampering. For example, diluting the reagent solution with water will cause a rapid change in the dielectric constant and conductivity of the reagent solution, and result in degraded emissions performance. As another example, the addition of electrolytic contaminants; e.g., salts, phosphates and the like will cause a rapid change in fluid conductivity. As yet another example, the addition of over-concentrated reagent solution will cause a rapid change in the dielectric constant of the reagent solution, and result in degraded emissions performance. As a further example, the addition of low dielectric constant contaminants, e.g., diesel fuel, will result in a rapid change in measured permittivity. Other examples will occur to those skilled in the art. In any case, the reagent quality monitoring logic block 90A illustrated in FIG. 4 is configured to synchronize the illustrated reagent quality diagnostic strategy with reagent holding tank refill events to detect any such rapid changes in the reagent solution characteristics.

Referring to FIGS. 5A-5D, plots of some of the operating values of the reagent quality monitoring logic block 90A of FIG. 4 are shown to illustrate operation of block 90A during an example reagent solution refill event. In the illustrated example, the level signal, L, produced by the level sensor 74 is illustrated in FIG. 5A as it transitions during a reagent solution refill event, $R_E$, from some reagent solution level below TR to a level slightly above TR. In the illustrated embodiment, the trigger threshold, TR, corresponds to a level of the reagent solution just below a "full" level of reagent solution in the reagent holding tank 28 (or 28') so that typical refilling of the reagent holding tank 28 (or 28') will ordinarily cause the level signal, L, to exceed "TR", thereby causing the comparator 122 to reset the timer 126 so that the timer 126 produces the enable signal, EN, to enable operation of the reagent quality monitoring logic block 90A. In this embodiment, as illustrated in FIG. 4, the control computer 40 is operable to determine from the level signal produced by the level sensor 74 whether a reagent solution refill event has occurred. Alternatively, the control computer 40 may be operable to detect reagent solution refill events using any one or more of the techniques described herein and/or using any conventional refill detection technique. For example, one such conventional refill detection technique may include monitoring a manually actuated switch (not shown) and determining that a reagent solution refill event has occurred if the switch has been activated. Those skilled in the art will recognize other conventional techniques for determining whether a reagent solution refill event has occurred, and any such other conventional techniques are intended to fall within the scope of the claims appended hereto.

In the illustrated example, reagent solution having a higher reagent concentration than that existing in the reagent holding tank 28 (or 28') is added during the refill event so that the long run average, LR, and the short run average, SR, of the reagent quality value, RQ, both rise during and following the refill event, $R_E$, as illustrated in FIGS. 5B and 5C. The difference value, LR-SR, drops below zero during the refill event due to the mismatch between the long and short run average values LR and SR respectively, and then slowly returns to zero as time passes, as illustrated in FIG. 5D. The timer 126 times out when a time period, TP, elapses following reset of the timer 126 at time TE, as illustrated in FIG. 5A, which then disables the fault detection timer block 108.

In the illustrated example, the reagent solution being added during the refill event is not so highly concentrated that the long run average, LR, falls outside of the boundary thresholds HTH or LTH, or that the difference value, LR-SR, falls outside of the boundary thresholds PTH or NTH, and the reagent quality monitoring logic block 90A accordingly will not set the fault signal, F, to an active fault status under the conditions illustrated in FIGS. 5A-5D. By way of example, one typical reagent solution may have a nominal reagent concentration of 35%, and in this case HTH may be 40%, LTH may be 30%, PTH may be 5% and NTH may be −5%. It will be understood that such numerical values are offered only for the purpose of providing an illustrative numerical example of FIGS. 5A-5D, and that other values and ranges may be used without limiting the scope of the claims appended hereto.

Referring again to FIG. 4, another illustrative embodiment 90B of the reagent quality monitoring logic block 90 is shown as a subset of the embodiment 90A. In this embodiment, the reagent quality monitoring logic block 90B includes all of the components of the embodiment 90A described hereinabove with the exception of the noise filter 120, the comparator 122, the memory block 124 and the timer block 126, as identified in FIG. 4 by the dashed-line perimeter, labeled 90B, that encompasses the remaining components. In this embodiment, only the difference between the long range average, LR, of the reagent quality signal, RQ, and the short run average, SR, of the reagent quality signal, RQ, is monitored and compared with the threshold values PTH and NTH to produce the fault output. This embodiment thus allows for the monitoring of relatively rapid changes in the reagent quality signal, RQ, independently of reagent solution refill events. Such changes could, for example, be indicative of the introduction of a relatively high-density contaminant into the reagent holding tank 28 (or 28') that may be provided in a form that will not significantly alter the liquid level of the reagent solution in the reagent holding tank 28 (or 28'). With regard to the fault signal produced by the fault detection timer 108, the reagent monitoring logic block 90B is operable in an identical manner as described with respect to the logic block 90A.

Figure 6:
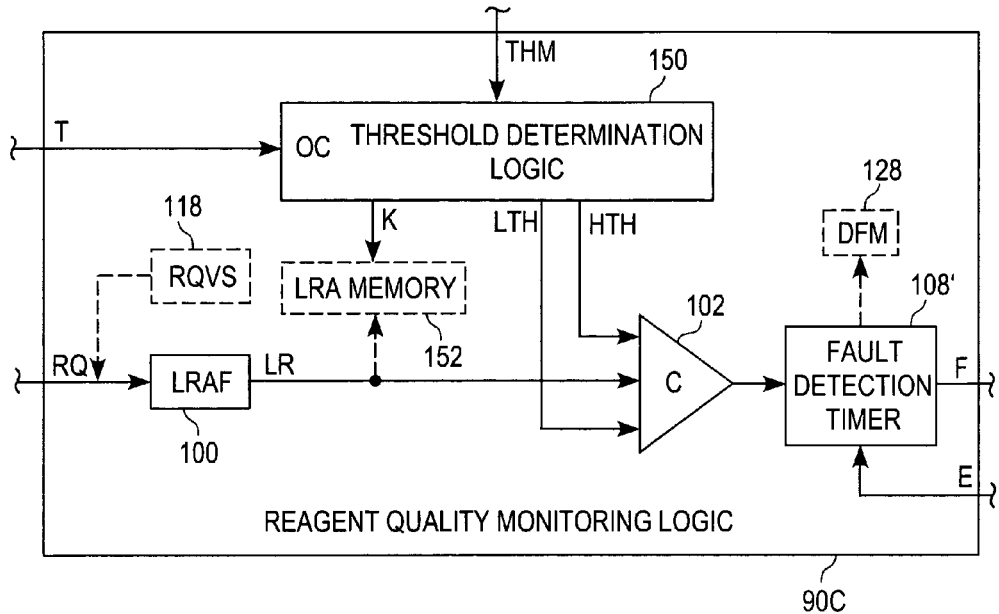
FIG. 6 is a schematic diagram of another illustrative embodiment of the reagent quality monitoring logic block of FIG. 3.

Referring now to FIG. 6, another illustrative embodiment 90C of the reagent quality monitoring logic block 90 is shown. All of the components of the reagent quality monitoring logic block 90C illustrated in FIG. 6 are intended to represent a software algorithm in the form of software structures and/or memory blocks. It will be understood, however, that any one or more such software structure and/or memory block may alternatively be provided in the form of one or more hardware circuits. For purposes of this disclosure and claims appended hereto, any of the components of the reagent quality monitoring logic block 90C illustrated in FIG. 6 may be referred to herein as a "circuit", wherein the term "circuit"

is intended to encompass both hardware circuits and software structures of the type just described and of the type illustrated in FIG. 6.

The reagent quality monitoring logic block 90C includes a number of components in common with the reagent quality monitoring logic block 90A illustrated in FIG. 4, and like numbers are therefore used in FIG. 6 to identify like components. For example, the reagent quality monitoring logic block 90C of FIG. 6 includes the long range averaging filter 100 and comparator 102, and may include the reagent quality virtual sensor block 118 and diagnostic fault memory 128 as shown in phantom in FIG. 6. Additionally, the reagent quality monitoring logic block 90C includes a threshold determination logic block 150 having an operating condition input, OC, receiving a signal; e.g., the reagent solution temperature signal produced by the temperature sensor 66, a threshold modification input receiving a threshold modification value or values, THM, produced by the reagent phase and aging diagnostic logic block 92 as will be described in greater detail hereinafter, a high threshold output, HTH, and a low threshold output, LTH. The high threshold output, HTH, provides a high threshold value to the comparator 102, and the low threshold output, LTH, provides a low threshold value to the comparator 102. The output of the comparator 102 is provided to a fault detection timer 108' that is similar to the fault detection timer 108 of FIG. 4 except that it has only a single comparator input coupled to the output of the comparator 102, and a single enable input receiving an enable signal, E, from the reagent phase and aging diagnostic logic block 92 as will be described in greater detail hereinafter.

In operation, the long range averaging filter 100, and if included the reagent quality virtual sensor block 118, are operable as described with respect to FIG. 4 to produce the long range filtered reagent quality value, LR, which is supplied to one input of the comparator 102. The threshold determination logic block 150 is responsive to the operating condition signal, which in FIG. 6 is the temperature signal produced by the temperature sensor 66, to determine the high and low threshold values HTH and LTH respectively as a function of the current value of the operating condition signal. This embodiment recognizes that one or more physical properties of the reagent solution contained in the reagent holding tank 28 (or 28') may vary as a function of a reagent solution operating condition, and the threshold determination logic block 150 accordingly provides for different high and low threshold values, HTH and LTH respectively under different reagent solution operating conditions. In the embodiment illustrated in FIG. 6, for example, the high and low thresholds, HTH and LTH are determined as a function of the reagent solution temperature, although it will be understood that the temperature signal may alternatively be replaced in other embodiments with one or more other reagent solution operating condition signals or values.

The functional relationship between the operating condition signal, e.g., reagent solution temperature, and the high and low threshold values, HTH and LTH respectively, that is determined by the threshold determination logic block 150 may be continuous, step-wise continuous or discrete, may be linear or non-linear, and may be implemented in the form of one or more tables, charts, graphs, equations, or the like. As one specific example, the threshold determination logic block 150 is configured in one embodiment to include a table mapping a predefined number, K, of reagent solution temperature ranges to high and low threshold pairs, HTH and LTH respectively. The temperature signal produced by the temperature sensor 66 is provided as an input to the table, and the high and low threshold values, HTH and LTH respectively that correspond to the temperature range in which the current value of the reagent solution temperature signal falls are provided to the comparator 102 as outputs of the logic block 150. The comparator thresholds HTH and LTH may be different for each of the "K" temperature ranges so that the error band of allowable reagent quality deviation may be separately controlled for each of the "K" temperature ranges. The comparator 102 is operable as described hereinabove in that it provides an active fault value to the fault detection timer 108' when LR is greater than HTH or less than LTH, and provides an inactive fault value when LR is bounded by HTH and LTH. The fault detection timer 108', when enabled, is operable to pass the fault value produced by the comparator 102 to the fault output, F, of the reagent quality monitoring logic block 90C after the fault detection timer 108' times out. In this embodiment, the reagent quality monitoring logic block 90C may further include a long range averaging memory block 152 receiving an integer value, K, identifying an appropriate one of the "K" temperature ranges in which the current value of the reagent solution temperature signal falls, and also receiving the long range average value, LR. The long range averaging memory block is partitioned into "K" storage areas, and is configured to store in each of the "K" storage areas the most recent LR value for the Kth temperature range. With regard to the fault signal produced by the fault detection timer 108', the reagent monitoring logic block 90C is operable in an identical manner as described with respect to the logic block 90A.

Figure 7:
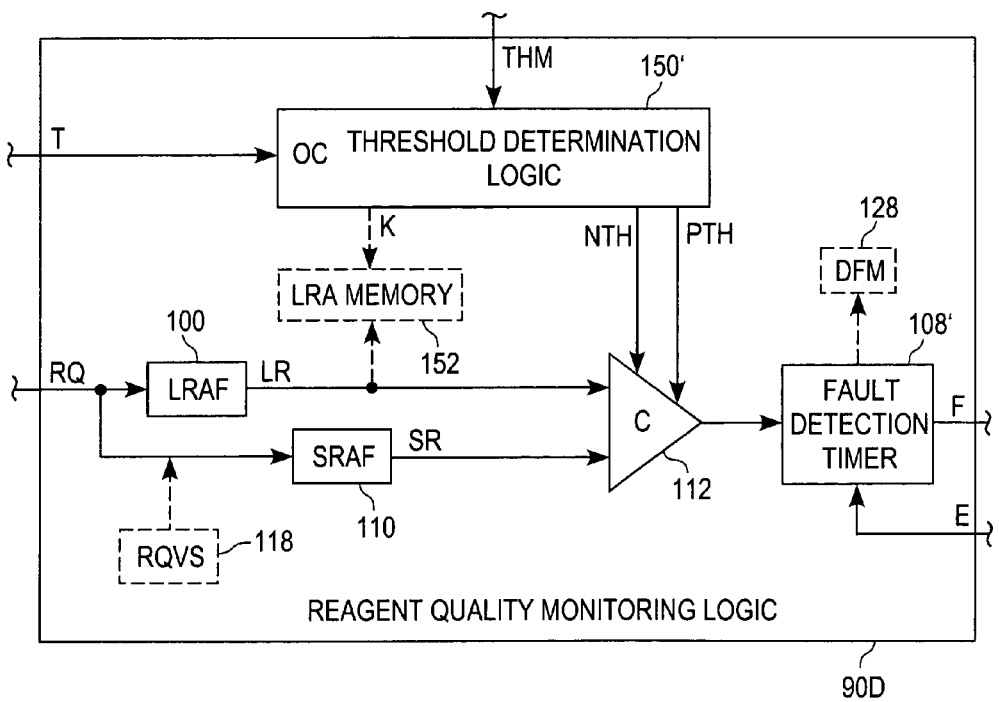
FIG. 7 is a schematic diagram of yet another illustrative embodiment of the reagent quality monitoring logic block of FIG. 3.

Referring now to FIG. 7, yet another illustrative embodiment 90D of the reagent quality monitoring logic block 90 is shown. All of the components of the reagent quality monitoring logic block 90D illustrated in FIG. 7 are intended to represent a software algorithm in the form of software structures and/or memory blocks. It will be understood, however, that any one or more such software structure and/or memory block may alternatively be provided in the form of one or more hardware circuits. For purposes of this disclosure and claims appended hereto, any of the components of the reagent quality monitoring logic block 90D illustrated in FIG. 7 may be referred to herein as a "circuit", wherein the term "circuit" is intended to encompass both hardware circuits and software structures of the type just described and of the type illustrated in FIG. 7.

The reagent quality monitoring logic block 90D includes a number of components in common with the reagent quality monitoring logic block 90A illustrated in FIG. 4 and the reagent quality monitoring logic block 90C illustrated in FIG. 6, and like numbers are therefore used in FIG. 7 to identify like components. For example, the reagent quality monitoring logic block 90D of FIG. 7 includes the long range averaging filter 100, the short range averaging filter 110, the comparator 112, and the fault detection timer 108', and may also include the reagent quality virtual sensor block 118, diagnostic fault memory 128 and LRA memory 152 as shown in phantom in FIG. 7. All of these components are operationally identical to like components described hereinabove. Additionally, the reagent quality monitoring logic block 90D includes modified version 150' of the threshold determination logic block 150 illustrated in FIG. 6. Specifically, since the comparator 112 is, in the embodiment illustrated in FIG. 7, operable to compare a difference between the long range average value, LR, and the short range average value, SR, to positive and negative thresholds, PTH and NTH respectively, as described hereinabove with respect to FIG. 4, the threshold determination logic block 150' in this embodiment is configured to produce PTH and NTH as a function of the reagent solution operating condition signal; e.g., the reagent temperature signal produced by the temperature sensor 66. Otherwise the structure and function of the threshold determination logic block 150' may be identical to the logic block 150 described with respect to FIG. 6. The reagent quality monitoring logic block 90D is operable to compare the difference between LR and SR to positive and negative threshold values, PTH and NTH respectively, wherein PTH and NTH are determined as a function of the reagent solution operating condition signal; e.g., reagent solution temperature, and to provide an active fault signal to the fault detection timer 108' when the difference is greater than PTH or less than NTH, and to provide an inactive fault value when the difference is bounded by PTH and NTH. The fault detection timer 108', when enabled, is operable to pass the fault value produced by the comparator 112 to the fault output, F, of the reagent quality monitoring logic block 90D after the fault detection timer 108' times out. With regard to the fault signal produced by the fault detection timer 108', the reagent monitoring logic block 90D is operable in an identical manner as described with respect to the logic block 90A.

Figure 8:
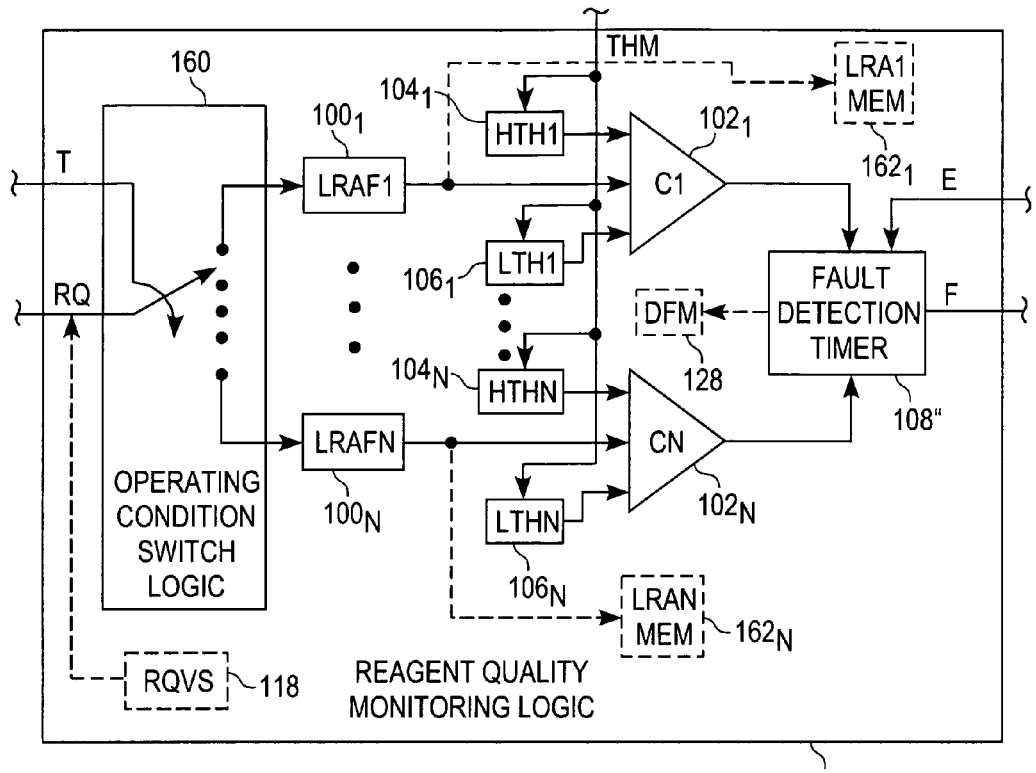
FIG. 8 is a schematic diagram of still another illustrative embodiment of the reagent quality monitoring logic block of FIG. 3.

Referring now to FIG. 8, still another illustrative embodiment 90E of the reagent quality monitoring logic block 90 is shown. All of the components of the reagent quality monitoring logic block 90E illustrated in FIG. 8 are intended to represent a software algorithm in the form of software structures and/or memory blocks. It will be understood, however, that any one or more such software structure and/or memory block may alternatively be provided in the form of one or more hardware circuits. For purposes of this disclosure and claims appended hereto, any of the components of the reagent quality monitoring logic block 90E illustrated in FIG. 8 may be referred to herein as a "circuit", wherein the term "circuit" is intended to encompass both hardware circuits and software structures of the type just described and of the type illustrated in FIG. 8.

The reagent quality monitoring logic block 90E includes a number of components in common with the reagent quality monitoring logic block 90A illustrated in FIG. 4 and the reagent quality monitoring logic block 90C illustrated in FIG. 6, and like numbers are therefore used in FIG. 8 to identify like components. For example, the reagent quality monitoring logic block 90E of FIG. 8 includes a number, N, of the combination of components including the long range averaging filter 100, the comparator 102, the high threshold memory block 104 and the low threshold memory block 106, and also may include a number, N, of the LAR memory blocks 162, wherein "N" may be any positive integer. The inputs to each of the "N" filters $100_1$-$100_N$ are supplied by a corresponding switch output of an operating condition switch logic block 160 having a switch input receiving the reagent quality signal, RQ, and having a switch control input receiving the reagent solution operating condition signal; e.g. reagent solution temperature. The reagent quality signal, RQ, may be produced by the reagent quality sensor 70 and/or by the reagent quality virtual sensor block 118 illustrated in phantom in FIG. 8. The "N" fault outputs of the number of comparators $102_1$-$102_N$ are supplied as inputs to a fault detection timer 108" having an enable input receiving the enable value produced by the reagent phase and aging diagnostic logic block 92, and having a fault output coupled to the fault output, F, of the reagent quality diagnostic logic block 62.

In operation, the operating condition switch logic block 160 is configured to selectively provide the reagent quality signal, RQ, to an input of an appropriate one of the "N" filters $100_1$-$100_N$ based on the current operating range of the operating condition signal. In the illustrated embodiment, for example, the operating condition switch logic block 160 is operable to selectively control the switch position to provide the reagent quality signal, RQ, to an input of an appropriate one of the "N" filters $100_1$-$100_N$ based on the current reagent solution operating temperature. If the reagent solution temperature is within a first temperature range, the switch logic block 160 is operable to route the reagent quality signal, RQ, to the input of the first filter $100_1$, and if the reagent solution temperature is within a second temperature range, the switch logic block 160 is operable to route the reagent quality signal, RQ, to the input of the second filter $100_2$, etc. The high and low threshold block pairs $104_1$-$104_N$ and $106_1$-$106_N$ respectively contain high and low threshold values specific to a selected temperature range so that each of the comparators $102_1$-$102_N$ may have different high and low switching thresholds specific to its designated temperature range. The fault outputs of the various comparators $102_1$-$102_N$ are provided as fault inputs to the fault detection timer 108", and the fault detection timer 108" is operable to provide an active fault to the fault output, F, if any of the fault outputs of the comparators $102_1$-$102_N$ is active, and to provide an inactive fault to the fault output, F, if none of the fault outputs of the comparators $102_1$-$102_N$ is active, after the fault detection timer times out. With regard to the fault signal produced by the fault detection timer 108", the reagent monitoring logic block 90E is operable in an identical manner as described with respect to the logic block 90A.

It will be appreciated that the embodiment 90E illustrated in FIG. 8 may be modified consistent with FIG. 7 so that instead of the "N" comparators $102_1$-$102_N$ producing a fault value depending upon the output of a corresponding LR value relative to corresponding HTH and LTH thresholds, there are instead "N" comparators $112_1$-$112_N$ each producing a fault value depending upon the difference between corresponding LR and SR values relative to corresponding PTH and NTH threshold values. The modifications to FIG. 8 required to effectuate such an alternative embodiment would be a mechanical step for a skilled artisan.

Figure 9A:
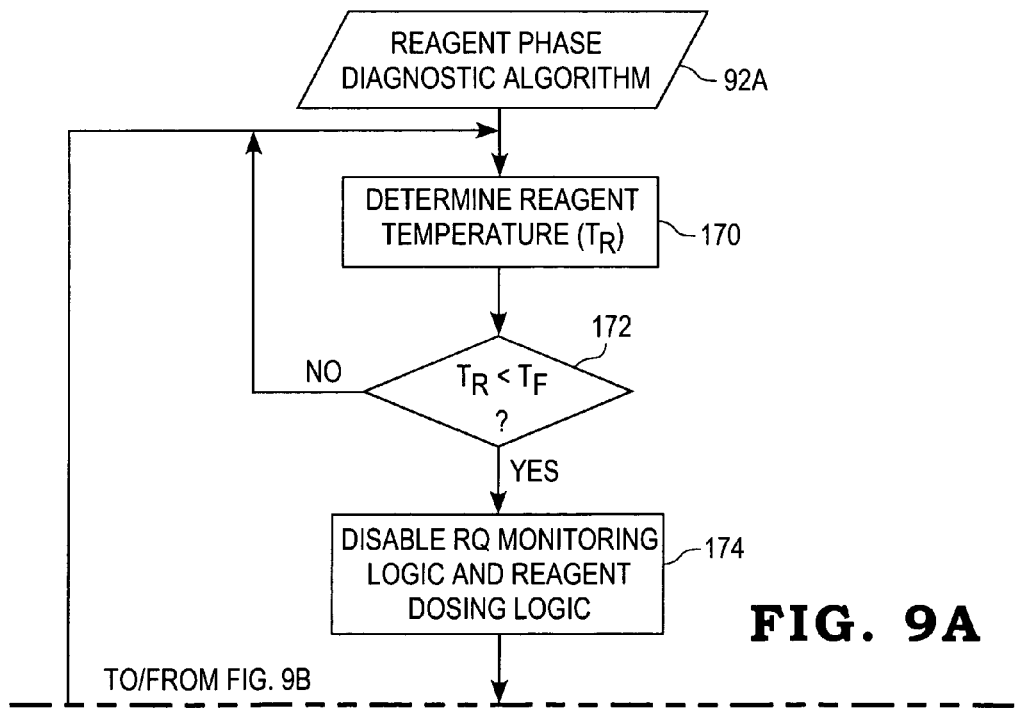
FIGS. 9A and 9B show a flowchart of one illustrative embodiment of a software algorithm that may be included within the reagent phase and aging diagnostic logic block of FIG. 3.
Figure 9B:
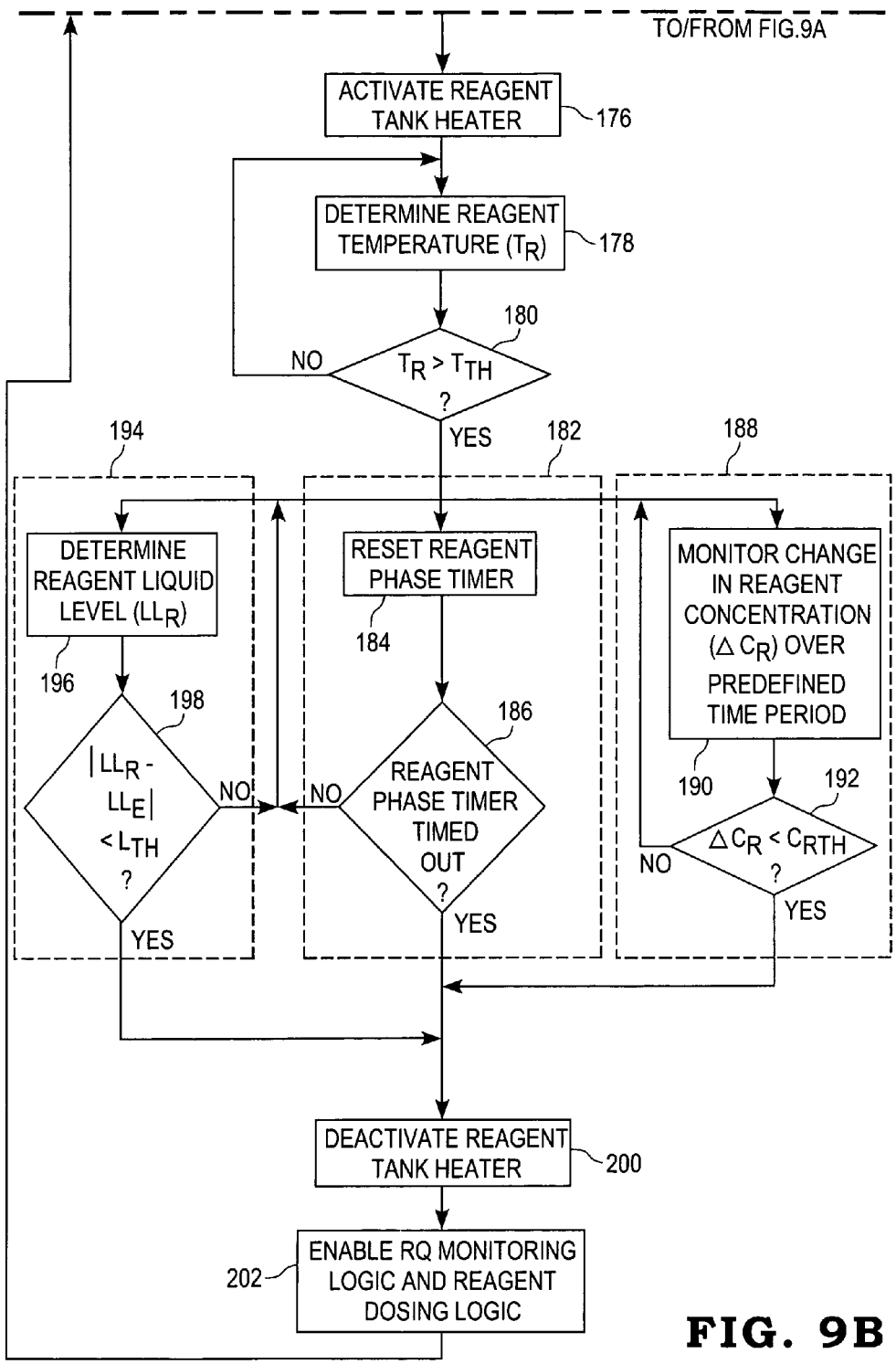

Referring now to FIGS. 9A and 9B, a flowchart of one illustrative embodiment of a software algorithm 92A that may be included within the reagent phase and aging diagnostic logic block 92 of FIG. 3 is shown. In the illustrated embodiment, the algorithm 92A is stored in a memory of the aftertreatment control computer 40, and is executed by the control computer 40. Alternatively, as described hereinabove, the algorithm 92A may be stored in a memory of the engine control computer 46 and executed by the engine control computer 46. In the following description, however, the algorithm 92A will be described as being executed by the aftertreatment control computer 40.

The algorithm 92A begins at step 170 where the control computer 40 is operable to determine the temperature, $T_R$, of the reagent solution within the reagent holding tank 28 (or 28') by monitoring the temperature signal produced by the temperature sensor 66. Thereafter at step 172, the control computer 40 is operable to compare the reagent solution temperature, $T_R$, to a freezing temperature, $T_F$. In embodiments wherein the reagent solution is an aqueous solution, $T_F$ may be the freezing temperature of water, or 0° C. Alternatively, $T_F$ may be the freezing temperature of the reagent solution, which may be different than that of water. Alternatively still, $T_F$ may be a temperature above the freezing temperature of water or of the reagent solution to, for example, provide an indicator, when $T_R$ is decreasing, of when $T_R$ is within a specified temperature of the actual freezing temperature of water or of the reagent solution. Alternatively still, $T_F$ may be a temperature below the freezing temperature of water or of the reagent solution to, for example, provide an indicator, when $T_R$ is decreasing, of when $T_R$ has dropped to a specified temperature below the actual freezing temperature of water or of the reagent solution. Those skilled in the art will recognize other temperature values and/or ranges that may be used for $T_F$, wherein any such other temperature values and/or ranges will generally relate in some manner to the freezing temperature of water or of the reagent solution contained in the reagent holding tank 28 (or '28), and any such other temperature values and/or ranges are intended to fall within the scope of the claims appended hereto. In any case, if the control computer 40 determines at step 172 that $T_R$ is not less than $T_F$, execution of the algorithm 92A loops back to step 170. If, at step 172, the control computer 40 determines instead that $T_R$ is less than $T_F$, algorithm execution advances to step 174 where the control computer 40 is operable to disable operation of the reagent quality monitoring logic block 90 and of the reagent dosing logic block 64 by producing inactive enable signals at both of the enable outputs "E" and "DE" illustrated in FIG. 3.

Following step 174, the control computer 40 is operable at step 176 to activate the reagent holding tank heater 80 (or 80') by producing an appropriate activation signal at the heater control output, HTR1. Thereafter at step 178, the control computer 40 is operable to again determine the temperature, $T_R$, of the reagent solution within the reagent holding tank 28 (or 28'), and at the following step 180 the control computer 20 is operable to compare $T_R$ to a threshold temperature, $T_{TH}$. In one embodiment, $T_{TH}$ corresponds to a temperature that is sufficiently above the freezing temperature of water or of the reagent solution to ensure that at least some of the reagent solution is in the liquid phase so that it may be dispensed into the emissions catalyst 24. Alternatively, $T_{TH}$ may correspond to a temperature that is sufficiently above the freezing temperature of water or of the reagent solution to allow at least some of the reagent solution to transition from solid (i.e., frozen) phase to liquid phase. Alternatively still, $T_{TH}$ may correspond to a temperature that is sufficiently above the freezing temperature of water or of the reagent solution to ensure that most or all of the reagent solution within the reagent holding tank 28 (or 28') is in the liquid phase. Those skilled in the art will recognize other temperature values and/or ranges that may be used for $T_{TH}$, wherein any such other temperature values and/or ranges will generally relate in some manner to a temperature at which the reagent solution contained in the reagent holding tank 28 (or '28) may be or has transitioned from solid (i.e., frozen) phase to liquid phase, and any such other temperature values and/or ranges are intended to fall within the scope of the claims appended hereto. In any case, if the control computer 40 determines at step 180 that $T_R$ is not greater than $T_{TH}$, execution of the algorithm 92A loops back to step 178.

If, at step 180, the control computer 40 determines instead that $T_R$ is greater than $T_{TH}$, execution of the algorithm 92A may branch to any one or more of a number of different steps. In one embodiment, for example, execution of the algorithm 92A may advance from the "yes" branch of step 180 directly to steps 200 and 202 where the control computer 40 is operable to deactivate the reagent holding tank heater 80 (or 80') by producing an appropriate heater deactivation signal at the heater control output, HTR1, and to enable for operation both the reagent quality monitoring logic block 90 and the reagent dosing logic block 94 by producing active enable signals at both of the enable outputs "E" and "DE" (see FIG. 3). Algorithm execution loops from step 202 back to step 170 for continual execution of algorithm 92A.

The algorithm 92A may additionally include step 182, as shown in phantom in FIG. 9B, which includes steps 184 and 186. In this embodiment, the "yes" branch of step 180 advances to step 184 where the control computer 40 is operable to reset a reagent phase timer. Thereafter at step 186, the control computer 40 is operable to determine whether the reagent phase timer has timed out. If not, algorithm execution loops back to step 184. If, on the other hand, the control computer 40 determines at step 186 that the reagent timer has timed out, algorithm execution advances to step 200.

The algorithm 92A may alternatively or additionally include step 188, as shown in phantom in FIG. 9B, which includes steps 190 and 192. In this embodiment, the system 10 includes a reagent solution concentration sensor and the "yes" branch of step 180 advances to step 190 where the control computer 40 is operable to monitor a change in the reagent concentration ($\Delta C_R$) over a predefined time period by monitoring the signal produced by the concentration sensor and determining $\Delta C_R$ over the most recent predefined time period. Thereafter at step 192, the control computer 40 is operable to compare $\Delta C_R$ to a regent concentration threshold, $C_{RTH}$, where $C_{RTH}$ generally corresponds to a reagent concentration difference value below which the reagent concentration signal produced by the reagent concentration sensor may be considered to have reached steady state. The value of $C_{RTH}$ will typically depend upon a number of factors that may include, but are not limited to, the particular application and attendant requirements of system 10, the concentration level of the reagent solution when it is completely in the liquid phase, the acceptable level of error in the steady state determination of $\Delta C_R$, and the like. In any case, if the control computer 40 determines at step 192 that $C_R$ is not less than $C_{RTH}$, execution of the algorithm 92A loops back to step 188. If, on the other hand, the control computer 40 determines at step 192 that $C_R$ is less than $C_{RTH}$, execution of the algorithm 92A advances to step 200.

The algorithm 92A may alternatively or additionally include step 194, as shown in phantom in FIG. 9B, which includes steps 196 and 198. In this embodiment, the "yes" branch of step 180 advances to step 196 where the control computer 40 is operable to determine the liquid level, $LL_R$, of the reagent solution in the reagent holding tank 28 (or 28') by monitoring the signal produced by the level sensor 74. Thereafter at step 198, the control computer 40 is operable to compare a difference between the liquid level, $LL_R$, of the reagent solution in the reagent holding tank 28 (or 28') and an expected liquid level of the reagent solution, $LL_E$, in the reagent holding tank 28 (or 28'), or $|LL_R - LL_E|$, to a liquid threshold $L_{TH}$. The expected liquid level, $LL_E$, generally corresponds to the expected level of the reagent solution contained within the reagent holding tank when the entirety of the reagent solution is in the liquid phase. In one embodiment, $LL_E$ may be determined by implementing the level sensor 74 as a conventional sensor of the type that senses the level of liquid phase portion of the reagent solution contained within the reagent holding tank 28 (or 28'). Alternatively, the control computer 40 may be configured to save as the expected liquid level, $LL_E$, the most recent reagent liquid level that was detected prior to branching from step 172 to step 174. Those skilled in the art will recognize other known techniques for determining the expected reagent liquid level, $LL_E$, and such other known techniques are intended to fall within the scope of the claims appended hereto.

$L_{TH}$ generally corresponds to a liquid level difference value below which the reagent solution level signal produced by the level sensor 74 may be considered to be sufficiently close to the expected liquid level, $L_E$. The value of $L_{TH}$ will typically depend upon a number of factors that may include, but are not limited to, the particular application and attendant requirements of system 10, the level of the reagent solution when it is completely in the liquid phase, the acceptable level of error between $LL_R$ and $LL_E$, and the like. In any case, if the control computer 40 determines at step 198 that $|LL_R-LL_E|$ is not less than $L_{TH}$, execution of the algorithm 92A loops back to step 196. If, on the other hand, the control computer 40 determines at step 198 that $|LL_R-LL_E|$ is less than $L_{TH}$, execution of the algorithm 92A advances to step 200.

The control computer 40 is operable, under the direction of the algorithm 92A illustrated and described with respect to FIGS. 9A and 9B, to disable the reagent quality monitoring logic block 90 and the reagent dosing logic block 64, and to activate the heater 80 (or 80'), when reagent solution freezing conditions are detected. When the temperature of the reagent solution contained within the reagent holding tank 28 (or 28') thereafter becomes sufficiently elevated resulting from operation of the heater and/or from increased ambient temperatures so that at least some of the reagent solution is in the liquid phase and is therefore available for dispensing, the control computer 40 is operable to deactivate the heater 80 (or 80') and enable operation of the reagent quality monitoring logic block 90 and the reagent dosing logic block 64. The amount of reagent solution available in the liquid phase prior to deactivating the heater 80 (or 80') and enabling operation of the reagent quality monitoring logic block 90 and the reagent dosing logic block 64 may be controlled in any one or more of a number of ways. In one embodiment, for example, the control computer 40 may require the temperature of the reagent solution contained within the reagent holding tank 28 (or 28') to be sufficiently elevated for a time period defined by a reagent phase timer before deactivating the heater 80 (or 80') and enabling operation of the reagent quality monitoring logic block 90 and the reagent dosing logic block 64. Alternatively or additionally, the control computer 40 may require the concentration of the reagent solution in the liquid phase to reach a predefined steady state concentration level before deactivating the heater 80 (or 80') and enabling operation of the reagent quality monitoring logic block 90 and the reagent dosing logic block 64. Alternatively or additionally, the control computer 40 may require the level of the liquid phase portion of the reagent solution contained in the reagent holding tank 28 (or 28') to be sufficiently near an expected liquid level before deactivating the heater 80 (or 80') and enabling operation of the reagent quality monitoring logic block 90 and the reagent dosing logic block 64. It will be understood that the algorithm 92A may include any one or more of the steps 182, 188 and 194, and that any combination of such steps may be executed in parallel as illustrated in FIG. 9B, or may instead be executed in series such that each consecutive one of the steps 182, 188 and 194 that are included within the algorithm 92A will not be executed until the "yes" branch of the preceding one of the steps 182, 188 and 194 that are included within the algorithm 92A is satisfied.

As the temperature of an aqueous reagent solution decreases, it will eventually transition from a pure liquid phase to a frozen solid phase. During this process, the reagent component will typically begin to crystallize and migrate away from the aqueous component as it starts to freeze. This often causes the distribution of the reagent in the reagent holding tank 28 (or 28') to become less uniform than it was while in the purely liquid phase. When the reagent holding tank 28 (or 28') is heated in order to re-liquefy the reagent solution (either actively using the reagent tank heater 80 (or 80'), or passively via a warmer ambient environment about the tank 28 (or 28')), the initial liquid reagent solution that results from the heating process may have a substantially stronger or weaker reagent concentration than the nominal concentration of the reagent solution when in the purely liquid phase. For example, if a region of the tank 28 (or 28') that froze late in the freezing process is the first to liquefy, the resulting liquid that first forms will likely be over-concentrated. If, on the other hand, a region of the tank 28 (or 28') that froze first is also the first to liquefy, the resulting liquid that first forms will likely be under-concentrated. It is desirable to avoid determining erroneous reagent quality faults and to also avoid dosing improper quantities of reagent solution into the emissions catalyst 24. Care must accordingly be taken with these two processes when the temperature of the reagent solution contained in the reagent holding tank 28 (or 28') is at or near freezing.

One strategy for avoiding erroneous reagent quality faults and improper reagent solution dosing amounts around freezing temperatures is to enable reagent quality monitoring and reagent solution dosing only when it is certain that at least some of the reagent solution contained in the reagent holding tank 28 (or 28') is in the liquid phase, and one embodiment of such a strategy was just described with reference to the algorithm 92A of FIGS. 9A and 9B. Another strategy for avoiding erroneous reagent quality faults and improper reagent solution dosing around freezing temperatures is to begin dosing and monitoring reagent solution quality when a minimum amount of reagent solution becomes available in the liquid phase, and adjusting both the reagent quality monitoring and reagent solution dosing processes as a function of the reagent concentration of the portion of the reagent solution that is in the liquid phase. One embodiment of such a strategy is provided in the form of a software algorithm of the type illustrated in FIG. 10.

Figure 10:
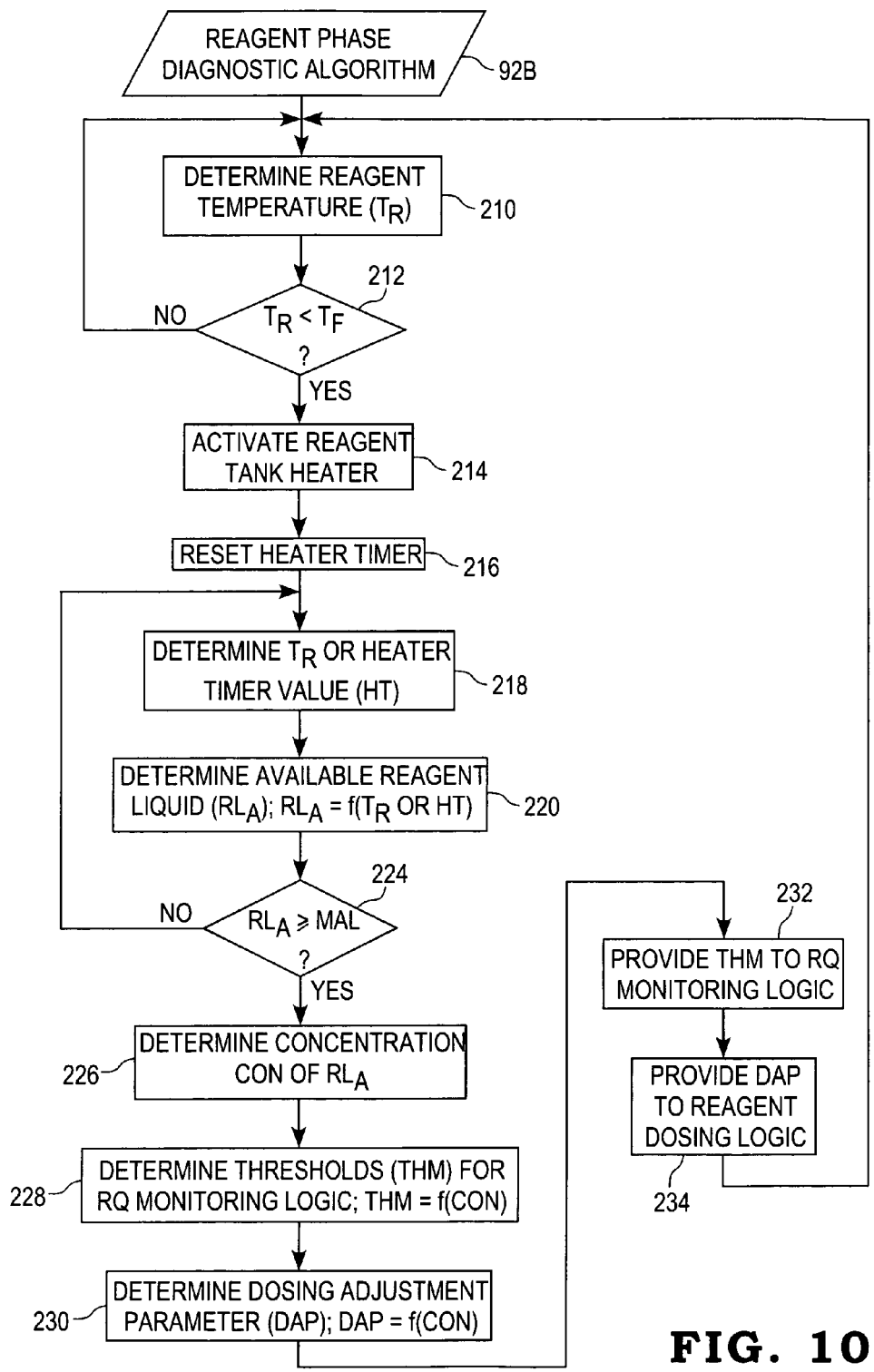
FIG. 10 is a flowchart of one illustrative embodiment of another software algorithm that may be included within the reagent phase and aging diagnostic logic block of FIG. 3.

Referring now to FIG. 10, a flowchart of another illustrative embodiment of a software algorithm 92B that may be included within the reagent phase and aging diagnostic logic block 92 of FIG. 3 is shown. In the illustrated embodiment, the algorithm 92B is stored in a memory of the aftertreatment control computer 40, and is executed by the control computer 40. Alternatively, as described hereinabove, the algorithm 92B may be stored in a memory of the engine control computer 46 and executed by the engine control computer 46. In the following description, however, the algorithm 92B will be described as being executed by the aftertreatment control computer 40. The software algorithm 92B represents an alternative or additional strategy to algorithm 92A for controlling operation of the reagent quality monitoring logic block 90 and the reagent dosing logic block 64 when reagent solution freezing conditions are detected. Generally, the software algorithm 92B will be optimally effective if the reagent solution heater 80, and at least the temperature sensor 66 and the reagent concentration sensor are positioned in close proximity to the reagent solution outlet of the reagent holding tank 28. One embodiment of such a reagent holding tank configuration is illustrated in FIG. 2, and for the purpose of describing the software algorithm 92B the reagent holding tank 28' and heater 80' will accordingly be specifically referred to.

The algorithm 92B begins at step 210 where the control computer 40 is operable to determine the temperature, $T_R$, of the reagent solution within the reagent holding tank 28' by monitoring the temperature signal produced by the combination sensor 78. Thereafter at step 212, the control computer 40 is operable to compare the reagent solution temperature, $T_R$, to a freezing temperature, $T_F$, where $T_F$ may be any of the freezing temperatures relating to the freezing temperature of water or of the reagent solution contained in the reagent holding tank 28' as described hereinabove with respect to the algorithm 92A of FIGS. 9A and 9B. If the control computer 40 determines at step 212 that $T_R$ is not less than $T_F$, execution of the algorithm 92B loops back to step 210. If, at step 212, the control computer 40 determines instead that $T_R$ is less than $T_F$, algorithm execution advances to step 214 where the control computer 40 is operable to activate the reagent holding tank heater 80' by producing an appropriate activation signal at the heater control output, HTR1, and then to step 216 where the control computer 40 is operable to reset a heater timer.

Following step 216, the control computer 40 is operable at step 218 to determine a reagent solution operating parameter relating to the temperature of the reagent solution contained within the reagent holding tank 28' resulting from the operation of the heater 80'. In one embodiment, for example, the control computer 40 is operable at step 218 to again determine the temperature, $T_R$, of the reagent solution within the reagent holding tank 28' as described above. Alternatively, the control computer 40 may be operable at step 218 to determine a current value, HT, of the heater timer, wherein HT corresponds to an elapsed time since activating the heater 80' at step 214. Following step 218, the control computer 40 is operable at step 220 to determine an available reagent liquid value, $RL_A$, as a function of $T_R$ or HT, wherein $RL_A$ corresponds to an amount of the reagent solution contained within the reagent holding tank 28' near the reagent solution outlet 88 that is in the liquid phase. The control computer 40 includes a table, graph, chart, or one or more equations relating $T_R$ or HT to $RL_A$ based on known relationships therebetween and taking into account other factors including, but not necessarily limited to, the reagent solution capacity of the reagent holding tank 28', the surface area and heat output of the heater 80', and the like.

In any case, execution of the algorithm 92B advances from step 220 to step 224 where the control computer 40 is operable to compare the available reagent liquid value, $RL_A$, to a minimum available liquid value, MAL, where MAL corresponds to a minimum quantity of liquid-phase reagent solution that is available for dispensing into the emissions catalyst 24. In one embodiment, MAL may correspond to a minimum amount of liquid-phase reagent solution required to allow for the dispensing of any amount of liquid-phase reagent solution into the emissions catalyst 24. Alternatively, MAL may correspond to a minimum amount of liquid-phase reagent solution required to allow for sustained dispensing of liquid-phase reagent solution into the emissions catalyst 24 for some predefined time period. Those skilled in the art will recognize that other values of MAL may be selected, and that any such other values of MAL are intended to fall within the scope of the claims appended hereto.

If, at step 224, the control computer 40 determines that $RL_A$ is not greater than or equal to MAL, execution of the algorithm 92B loops back to step 218. If, on the other hand, the control computer 40 determines at step 224 that $RL_A$ is greater than or equal to MAL, algorithm execution advances to step 226 where the control computer 40 is operable to determine the concentration, CON, of the available amount of liquid-phase reagent solution, $RL_A$, in the vicinity of the reagent solution outlet 88 by monitoring the concentration signal produced by the combination sensor 78. Thereafter at step 228, the control computer 40 is operable to determine one or more reagent quality monitoring thresholds, THM, as a function of the concentration value, CON, wherein the one or more reagent quality monitoring thresholds, THM, correspond to one or more of the comparator threshold values HTH, LTH, PTH and/or NTH of any of the reagent quality monitoring logic block embodiments 90A-90E illustrated and described herein. Thereafter at step 230, the control computer 40 is operable to determine a reagent dosing adjustment parameter, DAP, as a function of the concentration value, CON, wherein the reagent dosing adjustment parameter, DAP, is provided to the reagent dosing logic block 64.

Generally, the concentration of the available amount of liquid-phase reagent solution, $RL_A$, in the vicinity of the reagent solution outlet port 88 will vary as a function of the amount of liquid-phase reagent solution contained in the reagent holding tank 28' relative to the total amount; i.e., liquid and solid phase, of reagent solution contained in the reagent holding tank 28'. The control computer 40 is operable at steps 228 and 230 to determine THM and DAP as functions of the current value of the reagent concentration, CON, in a manner that allows the reagent quality monitoring logic block 90 and the reagent dosing logic block 64 to remain operational when $T_R$ falls below $T_F$ without erroneously triggering a reagent quality fault and while adjusting the reagent solution dosing rate and/or quantities to dispense appropriate amounts of the reagent solution based on its reagent concentration. The functions of steps 228 and 230 may be implemented in the form one or more tables, graphs, charts and/or one more equations.

Following step 230, the control computer 40 is operable at step 232 to provide THM to the THM input of the reagent quality monitoring logic block 90. In one embodiment, THM includes one or more reagent concentration-adjusted threshold values HTH, LTH, PTH and/or NTH for direct replacement of corresponding threshold values in any of the reagent quality monitoring logic block embodiments 90A-90E. Alternatively, THM may include one or more reagent concentration-adjusted offset values to be added to, or subtracted from corresponding ones of the HTH, LTH, PTH and/or NTH threshold values in any of the reagent quality monitoring logic block embodiments 90A-90E. Alternatively still, THM may include one or more reagent concentration-adjusted scaling values to be multiplied or divided by corresponding ones of the HTH, LTH, PTH and/or NTH threshold values in any of the reagent quality monitoring logic block embodiments 90A-90E, wherein the one or more scaling values may be positive or negative, and may be greater than or less than one. Those skilled in the art will recognize other known techniques for adjusting any of HTH, LTH, PTH and/or NTH, and any such other known techniques are intended to fall within the scope of the claims appended hereto.

Following step 232, the control computer 40 is operable at step 234 to provide DAP to the DAP input of the reagent dosing logic block 64. The reagent dosing logic block 64 is then operable to adjust the dosing rate and/or dosing quantities of the reagent solution dispensed into the emissions catalyst 24 based on the value of DAP. In one embodiment, DAP may be an offset value to be added to, or subtracted from, a corresponding dosing parameter in the reagent dosing logic block 64. Alternatively, DAP may be a scaling value to be multiplied or divided by a correspond dosing parameter in the reagent dosing logic block 64, wherein the scaling value may be positive or negative, and may be greater than or less than one. Those skilled in the art will recognize other known techniques for adjusting the dosing rate and/or dosing quantities of the reagent solution dispensed into the emissions catalyst 24, and any such other known techniques are intended to fall within the scope of the claims appended hereto. In any case, execution of the algorithm 92B loops from step 234 back to step 210.

The control computer 40 is operable, under the direction of the algorithm 92B illustrated and described with respect to FIG. 10, to activate the heater 80' of the reagent holding tank 28' when reagent solution freezing conditions are detected, to determine when an available amount of liquid-phase reagent solution greater than a minimum amount of liquid-phase reagent solution is thereafter available, and to then determine one or more reagent quality monitoring logic thresholds and a dosing adjustment parameter based on the concentration of the available amount of liquid-phase reagent solution. The one or more thresholds are then used to adjust one or more of the reagent quality monitoring logic threshold values HTH, LTH, PTH and/or NTH to avoid erroneous detection of reagent solution quality faults when $T_R$ falls below $T_F$. The dosing adjustment parameter is likewise used to adjust reagent solution dosing rates or quantities to ensure appropriate dispensing of the reagent solution into the emissions catalyst 24 when $T_R$ falls below $T_F$.

Figure 11:
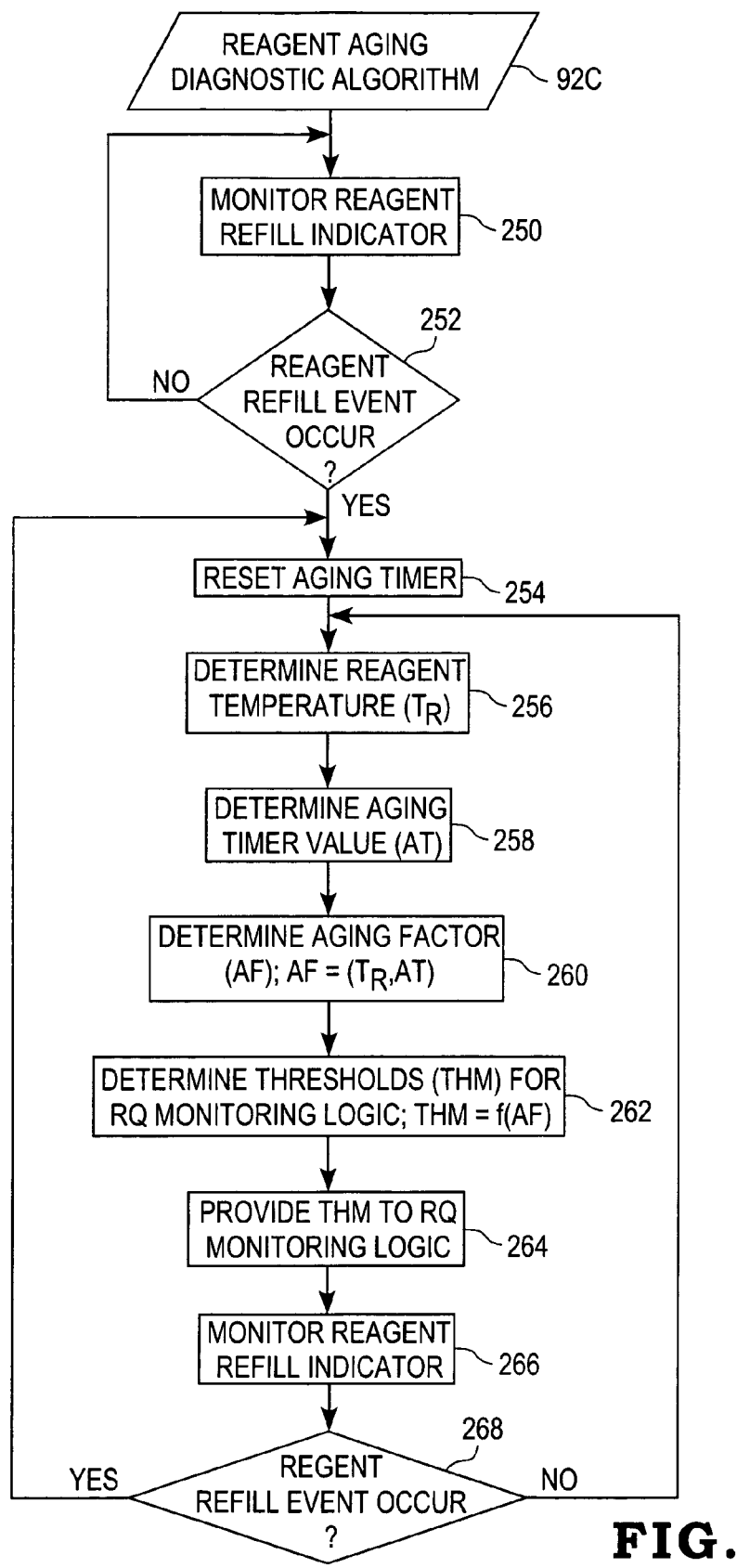
FIG. 11 is a flowchart of one illustrative embodiment of yet another software algorithm that may be included within the reagent phase and aging diagnostic logic block of FIG. 3.

Referring now to FIG. 11, a flowchart of another illustrative embodiment of a software algorithm 92C that may be included within the reagent phase and aging diagnostic logic block 92 of FIG. 3 is shown. In the illustrated embodiment, the algorithm 92C is stored in a memory of the aftertreatment control computer 40, and is executed by the control computer 40. Alternatively, as described hereinabove, the algorithm 92C may be stored in a memory of the engine control computer 46 and executed by the engine control computer 46. In the following description, however, the algorithm 92C will be described as being executed by the aftertreatment control computer 40. The software algorithm 92C represents a diagnostic algorithm for adjusting or modifying any one or more of the comparator thresholds in the reagent quality monitoring logic block 90 based on the age and temperature of the reagent solution contained in the reagent holding tank 28 (or 28') to avoid erroneous detection of reagent solution quality faults if/when the quality of the reagent solution varies resulting from age and/or operating temperature.

The algorithm 92C begins at step 250 where the control computer 40 is operable to monitor a reagent holding tank refill indicator, and thereafter at step 252 the control computer 40 is operable to determine from the reagent refill indicator whether a reagent solution refill event has occurred. In one embodiment, the control computer 40 is operable to execute steps 250 and 252 by monitoring the level signal produced by the level sensor 74, and determining that a reagent solution refill event has occurred if the level signal exceeds a predefined reagent solution level. Alternatively, the control computer 40 may be operable to execute steps 250 and 252 by monitoring a manually actuated switch (not shown) and determining that a reagent solution refill event has occurred if the switch has been activated. Those skilled in the art will recognize other conventional techniques for determining whether a reagent solution refill event has occurred as described hereinabove, and any such other conventional techniques are intended to fall within the scope of the claims appended hereto. In any case, if the control computer 40 determines at step 252 that a reagent solution refill event has not occurred, algorithm execution loops back to step 250. If, on the other hand, the control computer 40 determines at step 252 that a reagent solution refill event has occurred, algorithm execution advances to step 254 where the control computer 40 is operable to reset an aging timer.

Following step 254, the control computer 40 is operable at step 256 to determine the temperature, $T_R$, of the reagent solution in the reagent holding tank 28 (or 28') by monitoring the signal produced by the temperature sensor 66. Thereafter at step 258, the control computer 40 is operable to determine the elapsed time value, AT, of the aging timer, where AT corresponds to the elapsed time since the most recent reagent tank refill event. From step 258, the algorithm advances to step 260 where the control computer 40 is operable to determine an aging factor, AF, as a function of the reagent solution temperature, $T_R$, and of the current value, AT, of the aging timer. In one embodiment, the aging factor, AF, is determined by integrating the current value, AT, of the aging timer, and multiplying the result by the reagent solution temperature, $T_R$. Alternatively, the aging factor, AF, may be determined from one or more tables, graphs or charts mapping AT and $T_R$ to aging factor values, AF. In any case, the aging factor, AF, is an indicator of the age of the reagent solution in the reagent holding tank 28 (or 28') as it relates to the effect of reagent solution age on the quality of reagent in the reagent solution, and taking into account as well the operating temperature, $T_R$, of the reagent solution. Those skilled in the art will recognize other conventional techniques for determining an aging factor, AF, that is indicative of the age of the reagent solution in relation to the effect of reagent solution age on reagent quality, and any such other conventional techniques are intended to fall within the scope of the claims appended hereto.

Following step 260, the control computer 40 is operable at step 262 to determine one or more reagent quality monitoring thresholds, THM, as a function of the aging factor, AF, wherein the one or more reagent quality monitoring thresholds, THM, correspond to one or more of the comparator threshold values HTH, LTH, PTH and/or NTH of any of the reagent quality monitoring logic block embodiments 90A-90E illustrated and described herein. Thereafter at step 266, the control computer 40 is operable to provide the one or more reagent quality monitoring thresholds, THM, to the reagent quality monitoring logic block 90. Generally, the quality of the reagent solution will vary as a function of its age and operating temperature. The control computer 40 is thus operable at steps 262 and 264 to determine THM as a function of the current values of the reagent solution age, AT, and the reagent temperature, $T_R$, in a manner that allows for adjustment of one or more of the comparator threshold values HTH, LTH, PTH and/or NTH of any of the reagent quality monitoring logic block embodiments 90A-90E to thereby allow the reagent quality monitoring logic block 90 to remain operational as the reagent solution ages without erroneously triggering a reagent quality fault. The THM function may be implemented in the form of one or more tables, graphs, charts and/or one or more equations.

In one embodiment, THM includes one or more reagent quality-adjusted threshold values HTH, LTH, PTH and/or NTH, each as a function of AF, for direct replacement of corresponding threshold values in any of the reagent quality monitoring logic block embodiments 90A-90E. Alternatively, THM may include one or more reagent quality-adjusted offset values, each as a function of AF, to be added to, or subtracted from corresponding ones of the HTH, LTH, PTH and/or NTH threshold values in any of the reagent quality monitoring logic block embodiments 90A-90E. Alternatively still, THM may include one or more reagent quality-adjusted scaling values, each as a function of AF, to be multiplied or divided by corresponding ones of the HTH, LTH, PTH and/or NTH threshold values in any of the reagent quality monitoring logic block embodiments 90A-90E, wherein the one or more scaling values may be positive or negative, and may be greater than or less than one. Those skilled in the art will recognize other known techniques for adjusting any of HTH, LTH, PTH and/or NTH, and any such other known techniques are intended to fall within the scope of the claims appended hereto. In any case, execution of the algorithm 92C advances from step 264 to steps 266 and 268 where the control computer 40 is again operable to determine whether a reagent solution refill event has occurred. If so, algorithm execution loops back to step 254. If, at step 268, the control computer 40 determines that a reagent solution refill event has not occurred, algorithm execution instead loops back to step 256.

As an aqueous reagent solution ages, it may progressively transform into other compounds. For example, if the reagent solution is an aqueous solution of urea, it may progressively transform into ammonia as it ages. This process generally accelerates at higher solution temperatures, but may partially reverse itself as the solution temperature cools. While these changes may not affect the NOx reduction efficiency of the reagent solution, they may affect one or more of the physical properties of the reagent solution; e.g., electrical conductivity, from which the reagent quality signal, RQ, is determined. The control computer 40 is thus operable, under the direction of the algorithm 92B illustrated and described with respect to FIG. 11, to monitor the age and temperature of the reagent solution contained in the reagent holding tank 28 (or 28') following each reagent solution refill event, and to adjust one or more of the reagent quality monitoring logic threshold values HTH, LTH, PTH and/or NTH as a function of reagent solution age and temperature to avoid erroneous detection of reagent solution quality faults as the reagent solution ages.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, it will be appreciated that the system 10 illustrated in FIG. 1 may not include an aftertreatment control computer 40, and the reagent quality diagnostic logic block 62 and reagent dosing logic block 64 in such embodiments may instead be implemented in, and executed by, the engine control computer 46. In such embodiments, the engine control computer may further include one or more memory locations for storing one or more active faults determined by the reagent quality diagnostic logic block 62. As another example, it will be appreciated that in embodiments of the system 10 that include the aftertreatment control computer 40, the aftertreatment control computer 40 may not be linked in data communications with the engine control computer 46. In such embodiments, the aftertreatment control computer 40 may include suitable data outputs directly connecting the fault output, F, of the reagent quality diagnostic logic block 62 to the malfunction indicator lamp 54 and/or the wireless transceiver 58.

What is claimed is:

1. A system for diagnosing the quality of a reagent solution, comprising:
   a reagent solution source configured to supply the reagent solution to an emissions catalyst of an internal combustion engine, means for determining a quality value corresponding to the quality of the reagent solution,
   a long run averaging filter configured to receive the quality value and produce a long run average of the quality value,
   a short run averaging filter configured to receive the quality value and produce a short run average of the quality value,
   a comparator configured to compare a difference between the long run average of the quality value and the short run average of the quality value to a first threshold and produce a fault value if the difference crosses the first threshold,
   a temperature sensor configured to produce a temperature signal indicative of a temperature of the reagent solution, and
   a threshold determining circuit configured to produce the first threshold as a function of the temperature signal.

2. The system of claim 1 further comprising:
   a memory and,
   a fault detection timer configured to activate upon receipt of the fault value and to log the fault value in the memory when the fault detection timer expires after activation thereof.

3. The system of claim 2 wherein the fault detection timer has an enable input configured to receive an enable value,
   and wherein the fault detection timer is configured to log the fault value in the memory only if the enable value is active and to otherwise not log the fault value in the memory.

4. The system of claim 3 further comprising:
   a temperature sensor configured to produce a temperature signal indicative of a temperature of the reagent solution, and
   a control circuit responsive to the temperature signal to activate the enable value if the temperature of the reagent solution is above a first predefined temperature.

5. The system of claim 4 further comprising a heater configured to heat the reagent solution,
   wherein the control circuit is responsive to the temperature signal to deactivate the enable value and activate the heater if the temperature of the reagent solution is below the first predefined temperature.

6. The system of claim 5 further comprising means for determining a level of the reagent solution within the reagent solution source, wherein the control circuit is configured to monitor the temperature signal after activating the heater and to deactivate the heater and activate the enable value if a difference between the liquid level of the reagent solution when the temperature of the reagent solution is above a second predefined temperature greater than the first predefined temperature and an expected liquid level is less than a threshold level.

7. The system of claim 5 wherein the control circuit is configured to monitor the temperature signal after activating the heater and to reset a timer when the temperature of the reagent solution is above a second predefined temperature greater than the first predefined temperature, and to then deactivate the heater and activate the enable value when the timer times out.

8. The system of claim 5 further comprising means for monitoring a change in concentration of the reagent solution over a predefined time period,
   and wherein the control circuit is configured to monitor the temperature signal after activating the heater and to deactivate the heater and activate the enable value if the change in concentration of the reagent solution over the predefined time period is less than a concentration threshold when the temperature of the reagent solution is above a second predefined temperature.

9. The system of claim 1 wherein the comparator is configured to a compare the difference between the long run average of the quality value and the short run average of the quality value to a second threshold different from the first threshold and to produce the fault value if the difference crosses the second threshold.

10. The system of claim 9 wherein a range of acceptable quality values is defined between the first and second thresholds;
   and wherein the comparator is configured to produce the fault value if the difference is outside the range of acceptable quality values.

11. The system of claim 10 further comprising:
a threshold determining circuit configured to produce the first threshold and the second threshold each as a function of the temperature signal.

12. The system of claim 11 further comprising:
a memory and,
a fault detection timer configured to activate upon receipt of the fault value and to log the fault value in the memory when the fault detection timer expires after activation thereof.

13. The system of claim 12 wherein the fault detection timer has an enable input configured to receive an enable value,
and wherein the fault detection timer is configured to log the fault value in the memory only if the enable value is active and to otherwise not log the fault value in the memory.

14. The system of claim 13 further comprising:
a heater configured to heat the reagent solution, and
a control circuit responsive to the temperature signal to activate the enable value if the temperature of the reagent solution is above a first predefined temperature, and to otherwise activate the heater and deactivate the enable value.

15. The system of claim 14 further comprising:
means for determining a level of the reagent solution within the reagent solution source, and
means for monitoring a change in concentration of the reagent solution over a predefined time period,
wherein the control circuit is configured to monitor the temperature signal after activating the heater and to deactivate the heater and activate the enable value if at least one of the following conditions thereafter occur:
a difference between the liquid level of the reagent solution when the temperature of the reagent solution is above a second predefined temperature greater than the first predefined temperature and an expected liquid level is less than a threshold level,
a timer is reset when the temperature of the reagent solution is above the second predefined temperature and the timer thereafter times out, and
the change in concentration of the reagent solution over the predefined time period is less than a concentration threshold when the temperature of the reagent solution is above the second predefined temperature.

16. The system of claim 1 further comprising:
a fault lamp; and
a control circuit responsive to the fault value to illuminate the fault lamp.

17. The system of claim 1 further comprising:
a wireless transceiver; and
a control circuit responsive to the fault value to transmit the fault value to a remote receiver via the wireless transceiver.

18. The system of claim 1 further comprising:
a fuel system responsive to a fuel control signal to supply fuel to the engine; and
a control circuit responsive to the fault value to modify engine performance by modifying the fuel control signal.

* * * * *